(12) United States Patent
Jiang et al.

(10) Patent No.: US 9,628,289 B2
(45) Date of Patent: Apr. 18, 2017

(54) LIN NETWORK SLAVE NODE CONTROL SYSTEM, LIN NETWORK SLAVE NODE AND METHOD

(71) Applicant: Hangzhou Sanhua Research Institute Co., Ltd., Hangzhou, Zhejiang (CN)

(72) Inventors: Xiaojun Jiang, Zhejiang (CN); Yibing Jiang, Zhejiang (CN); Jinguo Dan, Zhejiang (CN); Weidong Xi, Zhejiang (CN)

(73) Assignee: Hangzhou Sanhua Research Institute Co., Ltd., Hangzhou, Zhejiang (CN)

( * ) Notice: Subject to any disclaimer, the term of this patent is extended or adjusted under 35 U.S.C. 154(b) by 155 days.

(21) Appl. No.: 14/415,186

(22) PCT Filed: May 29, 2013

(86) PCT No.: PCT/CN2013/000634
§ 371 (c)(1),
(2) Date: Jan. 16, 2015

(87) PCT Pub. No.: WO2014/012347
PCT Pub. Date: Jan. 23, 2014

(65) Prior Publication Data
US 2015/0200789 A1 Jul. 16, 2015
US 2016/0056973 A9 Feb. 25, 2016

(30) Foreign Application Priority Data

Jul. 19, 2012 (CN) .......................... 2012 1 0250782

(51) Int. Cl.
*H04L 12/66* (2006.01)
*H04L 12/403* (2006.01)
(Continued)

(52) U.S. Cl.
CPC ............ *H04L 12/403* (2013.01); *H04L 12/12* (2013.01); *H04L 12/40006* (2013.01);
(Continued)

(58) Field of Classification Search
None
See application file for complete search history.

(56) References Cited

U.S. PATENT DOCUMENTS 7,701,943 B2 4/2010 Harris et al.
2005/0102430 A1* 5/2005 Huber ................... G06F 1/3203
709/250
(Continued)

FOREIGN PATENT DOCUMENTS

CN 101572690 A 11/2009
CN 201965787 U 9/2011
CN 102346472 A 2/2012

OTHER PUBLICATIONS

International Search Report dated 5, 2013 from corresponding International Application PCT/CN2013/000634.

*Primary Examiner* — Michael J Moore, Jr.
(74) *Attorney, Agent, or Firm* — Wolf, Greenfield & Sacks, P.C.

(57) ABSTRACT

An LIN slave node control system, an LIN slave node and a method are provided. The system includes an electronic control part, which includes: an LIN signal detection, reception, and control module, a processing module connected to the LIN signal detection, reception, and control module and an LIN signal transmitting module connected to the processing module; the processing module generates, according to acquired analysis results, control signals for activating the LIN signal transmitting module, and transmits the control signals to the LIN signal detection, reception, and control module, or blocks LIN signal transmitting module and/or processing module control signals; the LIN signal detection,
(Continued)

reception, and control module activates the processing module according to awake signals from an LIN bus, activates the LIN signal transmitting module according to the control signals from the processing module, or can block the LIN signal transmitting module and/or the processing module.

20 Claims, 10 Drawing Sheets

(51) Int. Cl.
*H04L 12/40* (2006.01)
*H04L 12/12* (2006.01)

(52) U.S. Cl.
CPC .. *H04L 12/40013* (2013.01); *H04L 12/40019* (2013.01); *H04L 12/40032* (2013.01); *H04L 12/40039* (2013.01); *H04L 2012/40234* (2013.01); *Y02B 60/32* (2013.01)

(56) References Cited

U.S. PATENT DOCUMENTS

| | | | |
|---|---|---|---|
| 2005/0265344 | A1 | 12/2005 | Harris et al. |
| 2010/0106991 | A1* | 4/2010 | Noller ............... H04L 12/40039 713/323 |
| 2010/0231288 | A1* | 9/2010 | Horn ................. H03K 19/0016 327/524 |
| 2012/0257655 | A1* | 10/2012 | Muth ..................... H04L 12/12 375/219 |
| 2013/0318380 | A1* | 11/2013 | Behrens ................. H04L 12/12 713/323 |

* cited by examiner

LIN NETWORK SLAVE NODE CONTROL SYSTEM, LIN NETWORK SLAVE NODE AND METHOD

This application is the US national phase of International Application No. PCT/CN2013/000634 filed on May 29, 2013, which claims the priority of the Chinese Patent Application No. 201210250782.5, entitled "LIN NETWORK SLAVE NODE CONTROL SYSTEM, LIN NETWORK SLAVE NODE AND METHOD", filed with the Chinese Patent Office on Jul. 19, 2012, which applications are hereby incorporated by reference to the maximum extent allowable by law.

FIELD

The disclosure relates to the field of LIN (Local Interconnect Network) technology, and particularly to an energy saving control system and method for an LIN slave node.

BACKGROUND

Currently, LIN protocol is one of main protocols applied to a car, an LIN employing the LIN protocol includes a master node and multiple slave nodes, and the number of the slave nodes is no more than 15. The slave nodes may be used as a detector component (i.e. sensor) or an execution component (i.e. actuator), such as various types of detection modules and electric motor driver modules within the car. Due to the large number of the slave nodes, low power consumption of each slave node is beneficial to reduce power consumption of the whole LIN.

In addition, for the slave nodes applied to a car, it is also demanded that the power consumption of the slave nodes is as low as possible in the applied environment, particularly in a high temperature environment within an engine compartment, the temperature of the environment under which the engine successively can be up to 125 degree centigrade. Under such the high temperature environment, even an extra power is increased slightly, the temperature of the modules is raised greatly, and the reliability of the modules is reduced, as a result, a higher-level device can be employed only, which increases production cost.

A slave node applied to an LIN bus is disclosed in U.S. Pat. No. 7,701,943. With reference to FIG. 1, the slave node disables an LIN transmitting module 66 when receiving a signal, and activates the LIN transmitting module 66 only when transmitting an LIN signal, in this way, power consumption is reduced. In a case that the technical solution described in the patent is applied in an executor which is not required to operate successively, such as the slave node shown in U.S. Pat. No. 7,701,943, a defect of the invention of the patent is apparent. In such an application, the executor switches to a sleep state after completing a task, that is, a processor 62 (PROCESSING DEVICE) and an executing unit (HVAC LOUVRE MOTOR UNIT) shown in the FIG. 1 are also disabled or hibernated, to realize power saving. Generally, a period within which the executor is in the sleep state is much more than a period within which the executor executes the task, these modules or components cannot be disabled or herniated during the period within which the executor is in the sleep state, extra power consumption is generated. Also, the longer time the executor is in the sleep state, the larger the unnecessary extra power consumption is, and the more apparent the imperfection of the invention is.

For example, an average current is 100 mA in a case that a controlled component is driven to operate by the executor, and an average current is 10 mA in a case that the controlled component does not operate and all modules are maintained to be in an activated state, where the current greater than 8 mA is generated by the processing module and the driver module. Specifically, in a case that the period within which the executor does not operate is above 12.5 times longer than the period within which the executor operates, the extra power consumption is greater than actual effective power consumption. Generally, the ratio may be higher, which results in that the extra power consumption is much greater than the actual effective power consumption.

There are various types of slave nodes in an LIN. Some nodes can be switched to the sleep state in a case that the bus in the hibernated state, and some nodes can partially be switched to the sleep state even in a case that the bus is awake. In a case that the solution described above is applied to all slave nodes within the network, large extra power consumption is generated. The more the slave nodes are, the larger the LIN is, and the greater the defect is. In the solution described in the patent, the LIN transmitting module is activated only when required to transmit the LIN signal, in this way, the power consumption of the whole slave node may be reduced partially, however, the effect is not significant. With reference to FIG. 1, it can be seen that, besides an LIN receiving module 60 and the LIN transmitting module 66, the node includes a processing module 62 and an IGFS sensor module 64, extra power consumption is also generated in a case that the processing module 62 and the IGFS sensor module 64 are maintained to be in the activated state when these modules are not required to operate. The LIN transmitting module only performs a logical level conversion function, the processing module 62 is a control center of the whole node, and the sensor module 64 is a function executing component, compared with the LIN transmitting module, the processing module 62 and the sensor module 64 have more complex function and larger power consumption, the invention described above does not relates to how to reduce power consumption of the module within the node having the largest power consumption, which is to be improved by the disclosure.

SUMMARY

In order to solve the technical problems described above, a control system for an LIN slave node, an LIN slave node and a control method for an LIN slave node are provided in the disclosure, to reduce power consumption of the LIN slave node.

In order to realize the object described above, the following technical solution is employed in the disclosure.

The control system for an LIN slave node includes an electronic control part, the electronic control part includes an LIN signal detection, reception and control module, a processing module connected to the LIN signal detection, reception and control module and an LIN signal transmitting module connected to the processing module; where the LIN signal detection, reception and control module is configured to transmit a signal detected on an LIN bus to the processing module, that is, the LIN signal detection, reception and control module is configured to recognize a relevant signal on the LIN bus and forward the signal to the processing module;

the processing module is configured to analyze the signal to obtain an analysis result, and transmit a feedback signal corresponding to the analysis result to the LIN bus by the LIN signal transmitting module;

the LIN signal transmitting module is configured to output the feedback signal output from the processing module to the LIN bus;

the processing module is further configured to, based on the obtained analysis result, generate a control signal for activating the LIN signal transmitting module and transmit the control signal to the LIN signal detection, reception and control module, or generate a control signal for disabling the LIN signal transmitting module and/or the processing module and transmit the control signal to the LIN signal detection, reception and control module; and the LIN signal detection, reception and control module is configured to activate the processing module based on a wakeup signal on the LIN bus, and further configured to activate the LIN signal transmitting module or disable the LIN signal transmitting module and/or the processing module based on the control signal from the processing module.

In a case that a hibernation instruction from the LIN bus is received by the LIN signal detection, reception and control module, or a period within which there is no signal on the LIN bus exceeds a preset length of time, or the processing module determines that a preset condition for switching the LIN slave node to a sleep mode is met, that is, it is determined that the LIN slave node is required to be switched to a hibernated state or a sleep state, the processing module controls the LIN signal detection, reception and control module to disable the LIN signal transmitting module and the processing module; or the processing module controls the LIN signal detection, reception and control module to disable the LIN signal transmitting module and switch the processing module to the hibernated state;

when the wakeup signal is received, LIN signal detection, reception and control module activates the processing module in a disabled state, or the wakeup signal activates the processing module in the hibernated state; and the processing module controls the LIN signal detection, reception and control module to activate the LIN signal transmitting module; or the processing module controls, based on a received signal, the LIN signal detection, reception and control module to activate the LIN signal transmitting module or maintain the LIN signal transmitting module to be in the disabled state.

The electronic control part may further include a function executing module configured to execute an instruction output from the processing module and return a feedback signal, the function executing module has an activated state, the hibernated state and the disabled state, the function executing module is connected to the processing module; the processing module is configured to directly activate or hibernate the function executing module, or the LIN signal detection, reception and control module is configured to activate or disable the function executing module based on a control signal from the processing module.

The LIN slave node may further include a power supply module connected to an external power supply, the power supply module supplies power to the LIN signal detection, reception and control module, the LIN signal transmitting module, the processing module and the function executing module; the LIN signal detection, reception and control module activates or disables the LIN signal transmitting module, the processing module and the function executing module by controlling the power supply module to supply power to the LIN signal transmitting module, the processing module and the function executing module or not; or the LIN signal detection, reception and control module may directly control the LIN signal transmitting module to be disabled or activated based on the control signal transmitted by the processing module.

The function executing module may include a detection module configured to detect information on the LIN slave node and transmit the feedback signal to the processing module, or may include a driver module configured to control a mechanical component connected to the driver module based on a signal output from the processing module, or may include both the detection module and the driver module.

The LIN slave node may include five operation modes of a sleep mode, a first quasi-sleep mode, a second quasi-sleep mode, a quasi-operation mode and a complete operation mode, based on an operation state of the LIN signal transmitting module, the processing module and the function executing module;

where in the sleep mode, the LIN signal detection, reception and control module is in an activated state, and other modules are in a disabled state or in a hibernated state; in the first quasi-sleep mode, the LIN signal detection, reception and control module is in the activated state, the processing module is in the activated state, and other modules are in the hibernated state or in the disabled state; in the second quasi-sleep mode, the function executing module is in the hibernated state or in the disabled state; in the quasi-operation mode, the LIN signal transmitting module is in the disabled state; in the complete operation mode, all modules are in the activated state.

The disclosure may further provide a control method for an LIN slave node, including:

recognizing, by an LIN signal detection, reception and control module, a wakeup signal on an LIN bus and activating a processing module;

receiving and forwarding, by the LIN signal detection, reception and control module, the signal on the LIN bus;

generating, by a processing module, based on the signal, a control signal for activating an LIN signal transmitting module, or a control signal for disabling the LIN signal transmitting module and/or the processing module; and activating, by the LIN signal detection, reception and control module, the LIN signal transmitting module, or disabling the LIN signal transmitting module and/or the processing module by controlling a state of a power supply module for supplying power to the LIN signal transmitting module and the processing module based on the control signal generated by the processing module.

The control method for the LIN slave node may further includes:

receiving and forwarding, by the LIN signal detection, reception and control module, the signal on the LIN bus;

generating, by the processing module, based on the signal, a control signal for activating the LIN signal transmitting module and/or the function executing module, or a control signal for disabling the LIN signal transmitting module and/or the processing module and/or the function executing module; and activating, by the LIN signal detection, reception and control module, the LIN signal transmitting module and/or the function executing module, or disabling the LIN signal transmitting module and/or the processing module and/or the function executing module by controlling a state of the power supply module for supplying power to the LIN signal transmitting module, the processing module and the function executing module based on the control signal generated by the processing module.

Specifically, in the step of activating, by the LIN signal detection, reception and control module, the LIN signal transmitting module and/or the function executing module, or disabling the LIN signal transmitting module and/or the processing module and/or the function executing module by controlling a state of the power supply module for supplying power to the LIN signal transmitting module, the processing module and the function executing module based on the control signal generated by the processing module comprises:

activating or disabling directly, by the LIN signal detection, reception and control module, the LIN signal transmitting module based on the control signal generated by the processing module; and hibernating or activating directly, by the processing module, the function executing module.

In the control method for the LIN slave node described above, the LIN slave node may include five operation modes of a sleep mode, a first quasi-sleep mode, a second quasi-sleep mode, a quasi-operation mode and a complete operation mode, based on an operation state of the LIN signal transmitting module, the processing module and the function executing module.

The disclosure further provides an LIN slave node, including an electronic control part, the electronic control part includes an LIN signal detection, reception and control module, a processing module and an LIN signal transmitting module; where the LIN signal detection, reception and control module is configured to recognize a signal on an LIN bus and transmit the signal to the processing module; the processing module is connected to the LIN signal detection, reception and control module, and is configured to analyze the signal to obtain an analysis result and transmit a feedback signal corresponding to the analysis result to the LIN bus via the LIN signal transmitting module; the LIN signal transmitting module is connected to the processing module, and is configured to output the feedback signal output from the processing module to the LIN bus;

in a case that a hibernation instruction from the LIN bus is received by the LIN signal detection, reception and control module, or a period within which there is no signal on the LIN bus exceeds a preset length of time, or the processing module determines that a preset condition for switching the LIN slave node to a sleep mode is met, the processing module controls the LIN signal detection, reception and control module to disable the LIN signal transmitting module and switch the processing module to a hibernated state; or the processing module controls the LIN signal detection, reception and control module to disable the LIN signal transmitting module and the processing module; and when a wakeup signal is received, the LIN signal detection, reception and control module activates the processing module in the disabled state, or the wakeup signal activates the processing module in the hibernated state.

After the processing module is activated, the processing module may control the LIN signal detection, reception and control module to activate the LIN transmitting module, or the processing module may control the LIN signal detection, reception and control module to activate or maintain the LIN signal transmitting module to be in the disabled state based on a received analysis result for an LIN signal.

The electronic control part may further include a function executing module connected to the processing module, the function executing module is configured to execute an instruction output from the processing module and return a feedback signal, the function executing module may be in any one of the disabled state, the hibernated state or an activated state;

the function executing module includes a detection module and/or a driver module, the driver module is configured to drive a mechanical part connected to the driver module, and the detection module is configured to detect information on the LIN slave node and transmit the feedback signal to the processing module; and the processing module is configured to directly activate or hibernate the function executing module, or the LIN signal detection, reception and control module is configured to activate or disable the function executing module based on a control signal from the processing module.

The LIN signal detection, reception and control module and the LIN signal transmitting module may be integrated into one integrated chip, the processing module and the function executing module may be integrated into separated integrated chips, respectively, or both the processing module and the function executing module may be integrated into one integrated chip; or the LIN signal detection, reception and control module, the LIN transmitting module, the processing module and the function executing module may also be integrated into one integrated chip.

The LIN slave node may include five operation modes of a sleep mode, a first quasi-sleep mode, a second quasi-sleep mode, a quasi-operation mode and a complete operation mode, based on an operation state of the LIN signal transmitting module, the processing module and the function executing module.

The disclosure may further provide an LIN, including an LIN bus, a master node connected to the LIN bus and a slave node connected to the LIN bus, where the slave node may include an electronic control part, and the electronic control part includes an LIN signal detection, reception and control module, a processing module and an LIN transmitting module; where the LIN signal detection, reception and control module is configured to recognize a signal on the LIN bus and transmit the signal to the processing module; the processing module is connected to the LIN signal detection, reception and control module, and is configured to analyze the signal to obtain an analysis result and transmit a feedback signal corresponding to the analysis result to the LIN bus via the LIN signal transmitting module; the LIN signal transmitting module is connected to the processing module, and is configured to output the feedback information output from the processing module to the LIN bus;

where in a case that a hibernation instruction from the LIN bus is received by the LIN signal detection, reception and control module, or a period within which there is no signal on the LIN bus exceeds a preset length of time, or the processing module determines that a preset condition for switching the LIN slave node to a sleep mode is met, the processing module controls the LIN signal detection, reception and control module to disable the LIN signal transmitting module and switch the processing module to a hibernated state; or the processing module controls the LIN signal detection, reception and control module to disable the LIN signal transmitting module and the processing module;

when a wakeup signal is received, the LIN signal detection, reception and control module activates the processing module in a disabled state, or the wakeup signal activates the processing module in a hibernated state; and after the processing module is activated, the processing module controls the LIN signal detection, reception and control module to activate the LIN transmitting module, or the processing module controls the LIN signal detection, reception and control module to activate the LIN signal transmitting module or maintain the LIN signal transmitting module to be in a disabled state based on an analysis result for an LIN signal.

The electronic control part of the LIN described above may further include a function executing module, and the function executing module may be in any one of the disabled state, the hibernated state or an activated state; the LIN slave node includes five operation modes of a sleep mode, a first quasi-sleep mode, a second quasi-sleep mode, a quasi-operation mode and a complete operation mode, based on an operation state of the LIN signal transmitting module, the processing module and the function executing module;

where in the sleep mode, the LIN signal detection, reception and control module is in an activated state, and other modules are in a disabled state or in a hibernated state; in the first quasi-sleep mode, the LIN signal detection, reception and control module is in the activated state, the processing module is in the activated state, and other modules are in the hibernated state or in the disabled state; in the second quasi-sleep mode, the function executing module is in the hibernated state or in the disabled state; in the quasi-operation mode, the LIN signal transmitting module is in the disabled state; in the complete operation mode, all modules are in the activated state.

The advantageous effect of the disclosure is that: according to the LIN slave node in the disclosure, it may be determined based on actual usage or an operating condition of the system that which module is required to be in the activated state or disabled state, and therefore, power consumption of the slave node is reduced; in the disclosure, the LIN signal detection, reception and control module is always in the activated state under a state of power-on, other modules may be not in the activated state when not required to operate, by which power consumption of these modules can be reduced, and further power consumption of the LIN slave node can be reduced, and therefore power consumption of the whole LIN can be reduced.

BRIEF DESCRIPTION OF THE DRAWINGS

In order to more clearly illustrate the technical solution in the embodiments of the disclosure or in the prior art, in the following, accompanying drawings required in the description of the embodiments or the prior art will be introduced simply. Obviously, the accompanying drawings in the following description are just some embodiments of the disclosure. For those skilled in the art, other accompanying drawings can also be obtained according to the accompanying drawings without any creative work.

DETAILED DESCRIPTION

"One embodiment" or "an embodiment" mentioned here refers to that particular features, structures or characteristics related to the described embodiment may be at least included in at least one implementation. In the specification, "embodiment" appearing at different positions is not necessary to indicate the same embodiment, and is not necessary to indicate an independent embodiment or an alternative embodiment mutually exclusive to other embodiment. In addition, a sequence of modules in a method, a flow diagram or a function block representing one or more embodiments does not refer to any particular sequence fixedly, and does not limit the disclosure.

Figure 1:
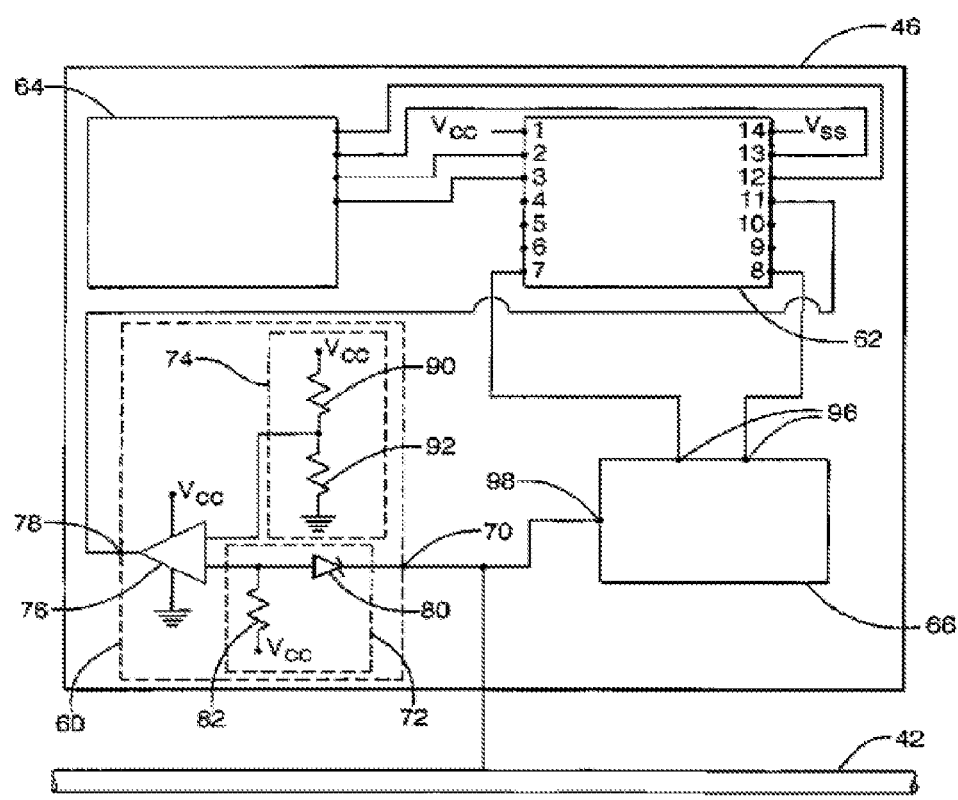
FIG. 1 is a structural diagram of an LIN bus slave node in the conventional art.
Figure 2A:
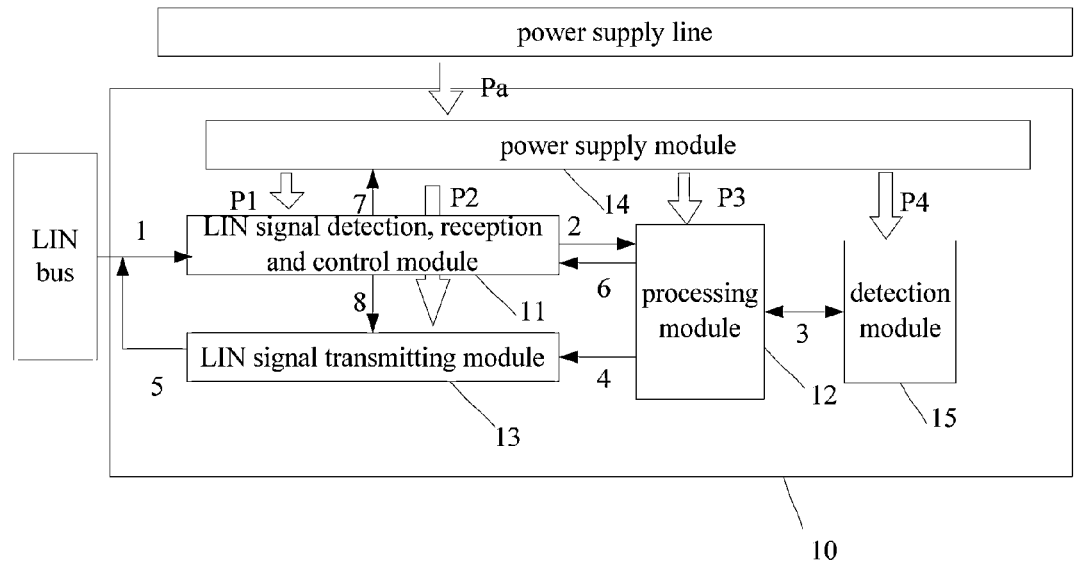
FIG. 2a is a schematic diagram of a control system for an LIN slave node according to the disclosure.

A reference is made to FIG. 2a which is a schematic diagram of a control system for an LIN slave node according to a first embodiment of the disclosure. The control system for the LIN slave node includes an electronic control part 10. The electronic control part 10 includes an LIN signal detection, reception and control module 11, a processing module 12 connected to the LIN signal detection, reception and control module 11 and an LIN signal transmitting module 13 connected to the processing module 12. The LIN signal detection, reception and control module 11 is configured to transmit a signal on an LIN bus to the processing module 12, and recognize whether a received low level signal meets a requirement for the length of time for a wakeup signal; the processing module 12 is configured to analyze the received signal and obtain an analysis result, and transmit a feedback signal corresponding to the analysis result to the LIN bus once the feedback signal is converted by the LIN signal transmitting module 13; the LIN signal transmitting module 13 is configured to convert the feedback signal output from the processing module 12, and transmit to the LIN bus.

The control system for the LIN slave node in the disclosure includes an LIN slave node, and the LIN slave node includes an electronic control part 10. The electronic control part 10 includes the LIN signal detection, reception and control module, the processing module and the LIN signal transmitting module introduced above.

The processing module 12 in the embodiment is further configured to, based on the obtained analysis result, generate a control signal for activating the LIN signal transmitting module 13 and transmit the control signal to the LIN signal detection, reception and control module 11, or generate a control signal for disabling the LIN signal transmitting module 13 and/or the processing module 12 and transmit the control signal to the LIN signal detection, reception and control module 11; the LIN signal detection, reception and control module 11 activates the processing module 12 based on a wakeup signal on the LIN bus, and activates the LIN signal transmitting module 13 or disables the LIN signal transmitting module 13 and/or the processing module 12 based on the control signal from the processing module 12.

In the specification of the disclosure, "disable" refers to that the module is in a non-operation state and is not supplied power; "activation" refers to that the module is in an operation state; and "hibernation" refers to that the module is supplied power, but only necessary part is maintained to operate, and unnecessary part is turned off.

The LIN signal detection, reception and control module 11 is always in an activated state in a state of power-on, and has functions for recognizing the wakeup signal, and for activating or disabling the processing module 12 and the LIN signal transmitting module 13. Specifically, the LIN signal detection, reception and control module 11 receives and recognizes a signal from the LIN bus on a first signal channel 1, and converts a signal level under an LIN protocol into a logical level meeting a requirement of the processing module 12, and outputs the logical level to the processing module 12 via a second signal channel 2; the processing module 12 transmits the feedback signal to the LIN signal transmitting module 13 via a fourth signal channel 4, the LIN signal transmitting module 13 converts the logical level signal transmitted by the processing module 12 into a signal level under the LIN protocol, and transmits the feedback signal to the LIN bus via a fifth signal channel 5.

The processing module 12 may also generate a control signal for activating the LIN signal transmitting module or a control signal for disabling the LIN signal transmitting module 13 and the processing module 12 based on the analysis result, and transmit the control signal to the LIN signal detection, reception and control module 11 via a sixth signal channel 6; in this way, the processing module 12 and the LIN signal transmitting module 13 in the electronic control part 10 of the LIN slave node according to the embodiment can be disabled or activated, and therefore, power consumption of modules within the node can be reduced.

The electronic control part may further include a function executing module which is configured to execute an instruction output from the processing module 12 and return a feedback signal, the function executing module may also be activated, disabled or hibernated. Specifically, the processing module 12 may directly activate the function executing module or hibernate the function executing module; or the LIN signal detection, reception and control module 11 activates or disables the function executing module based on the control signal from the processing module 12.

Specifically, with reference to FIG. 2a, the function executing module includes a detection module 15 which is configured to detect information on the LIN slave node and transmit a feedback signal to the processing module 12, the detection module 15 may be a temperature sensor unit, a humidity sensor unit, a pressure sensor unit or a combination of two thereof or three thereof. The LIN signal detection, reception and control module 11 activates or disables the detection module 15 based on the control signal from the processing module 12.

Figure 2B:
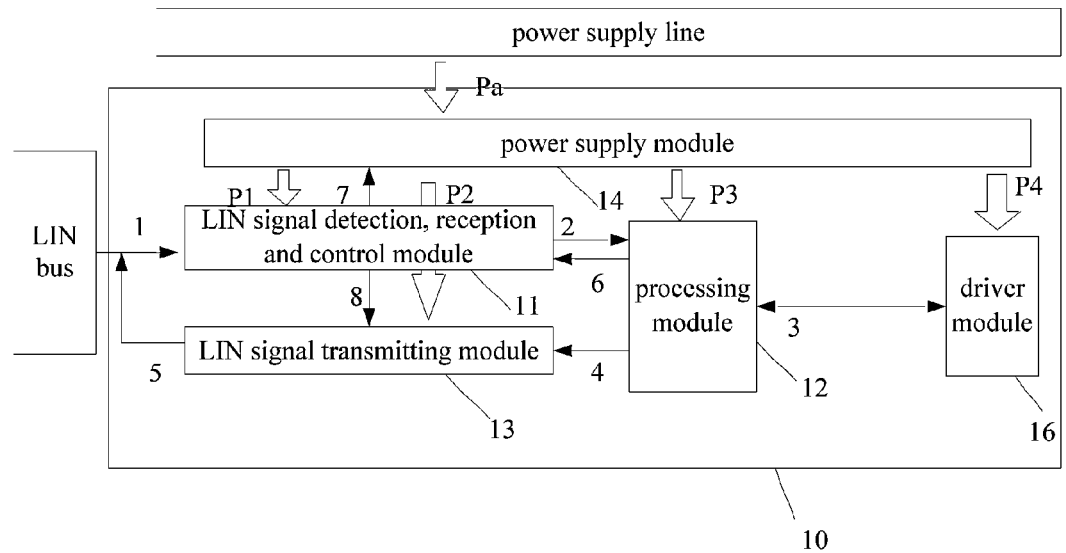
FIG. 2b is a schematic diagram of an electronic control part of a second control system for an LIN slave node according to an embodiment of the disclosure.

With reference to FIG. 2b, the function executing module may further include a driver module 16 connected with a mechanical component, the driver module 16 controls a signal based on the signal output from the processing module 12, the LIN signal detection, reception and control module 11 activates or disables the driver module 16 based on the control signal from the processing module 12.

Figure 2C:
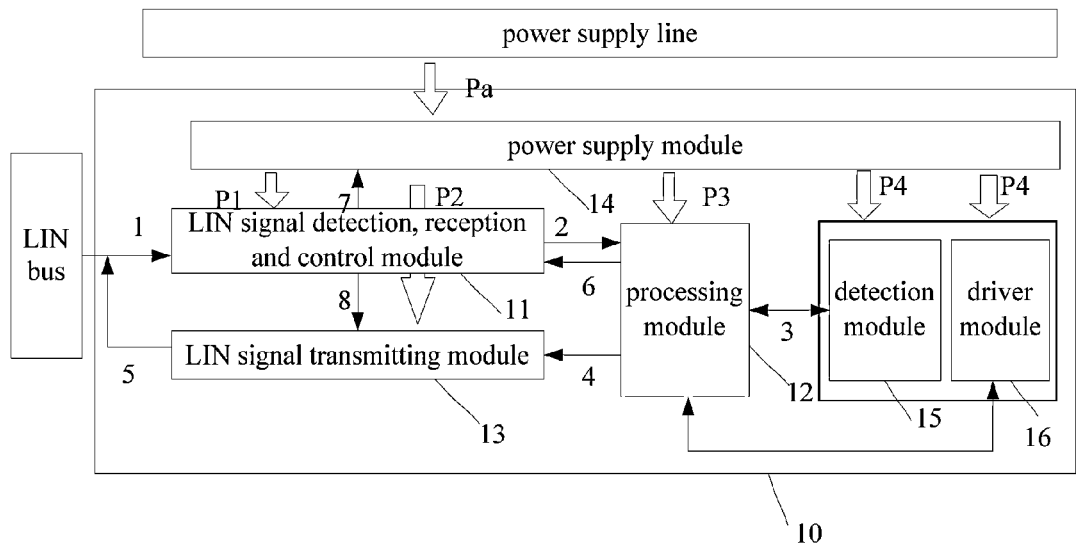
FIG. 2c is a schematic diagram of an electronic control part of a second control system for an LIN slave node according to an embodiment of the disclosure.

In addition, with reference to FIG. 2c, the function executing module may further include both the driver module 16 and the detection module 15, the detection module 15 is configured to detect the information on the LIN slave node and transmit the feedback signal to the processing module 12, the LIN signal detection, reception and control module 11 activates or disables the driver module 16 and the detection module 15 based on the control signal from the processing module 12.

In the embodiment described above, the LIN slave node may further include a power supply module 14, the power supply module 14 is always in the activated state in the state of power-on, receives a power input from an external power supply via a power supply line, and supplies power to the LIN signal detection, reception and control module 11, the LIN signal transmitting module 13, the processing module 12 and other modules; the LIN signal detection, reception and control module 11 activates or disables the LIN signal transmitting module 13, the processing module 12 and other modules by controlling the power supply module 14 to supply power to the LIN transmitting module 13, the processing module 12 and other modules or not via a seventh signal channel 7; specifically, the LIN signal detection, reception and control module 11 can determine whether it is required to wake up the LIN transmitting module 13, the processing module 12 and other modules by recognizing the wakeup signal on the LIN bus.

The LIN signal detection, reception and control module 11 disables or activates the LIN signal transmitting module 13 and the processing module 12 by controlling the power supply module 14 to supply power to the LIN transmitting module 13, the processing module 12 or not based on the control signal from the processing module 12 transmitted on a sixth signal channel 6, the LIN signal detection, reception and control module 11 controls the power supply module 14 by transmitting a control signal via the seventh signal channel 7.

In addition, in a case that the electronic control part 10 includes the function executing module, the LIN signal detection, reception and control module 11 can activate or disable the function executing module, such as the detection module 15 and/or the driver module 16, by controlling the power supply module 14 to supply power to both the function executing module such or not. The power supply module 14 may receive a power input from the power supply line via a fifth power channel Pa, specifically, the LIN signal detection, reception and control module 11, the LIN signal transmitting module 13 and the processing module 12 may be supplied power via a first power channel P1, a second power channel P2 and a third power channel P2, respectively, and the detection module 15 and/or the driver module 16 is supplied power by a fourth power channel P4. The LIN signal detection, reception and control module 11 may control a power output of the power supply module 14 by a signal output via the seventh signal channel 7.

The LIN signal detection, reception and control module may also directly disable or activate the LIN signal transmitting module via an eighth signal channel 8 based on the control signal transmitted from the processing module.

It should be illustrated that the signal channel may be a separate signal line physically, or may be a combination of several signal lines. For the separate signal line, for example, the first signal channel 1 may represent different meanings by using different forms of signal. For the combination of several lines, for example, the sixth signal channel 6 or the third signal channel 3 may represent different meanings not only by using a combination of signals on several signal lines but also by using different forms of signal on one signal line, or by using both the combination of signals or the different forms of signals.

For example, in the embodiment described above, the sixth signal channel 6 is a combination of an enable input signal line of the LIN signal detection, reception and control module and a first output signal line of the processing module; specifically, a signal on the first output signal line of the processing module and a signal on the fourth signal channel 4 may be the same output signal from the processing module.

Specifically, in a case that the first output signal line of the processing module is at a low level, the enable input signal line of the LIN signal detection, reception and control module is changed from at a high level to at a low level. In this case, both the LIN signal transmitting module and the processing module may be disabled. In a case that the first output signal line of the processing module is at a high level, the LIN signal detection, reception and control module enabled input signal line is changed from at a high level to at a low level, only the LIN signal transmitting module is disabled.

In a case that the enable input signal line of the LIN signal detection, reception and control module is changed from at a low level to at a high level, only the LIN signal transmitting module is activated.

Overall control commands are shown in Table 1.

TABLE 1

| Control Command | Enable input signal line of the LIN signal detection, reception and control module | First output signal line of the processing module |
| --- | --- | --- |
| Disable both the LIN signal transmitting module and the processing module | 1 to 0 | 0 |
| Disable only the LIN signal transmitting module | 1 to 0 | 1 |
| Activate only the LIN signal transmitting module | 0 to 1 | 0 or 1 |

In another embodiment of the disclosure, besides the enable input signal line of the LIN signal detection, reception and control module and the first output signal line of the processing module, the sixth signal channel 6 further includes a second output signal line of the processing module. Therefore, only the processing module can be disabled, only the driver module and/or the detection module can be disabled, or only the driver module and/or the detection module can be activated.

In a case that the first output signal line of the processing module is at a low level, and the second output signal line of the processing module is at a low level, the enable input signal line of the LIN signal detection, reception and control module is changed from at a high level to at a low level, both the LIN signal transmitting module and the processing module are disabled. In a case that the first output signal line of the processing module is at a high level, and the second output signal line of the processing module is at a low level, the enable input signal line of the LIN signal detection, reception and control module is changed from at a high level to at a low level, only the LIN signal transmitting module is disabled. In a case that the second output signal line of the processing module is at a low level, and the enable input signal the LIN signal detection, reception and control module enabled input signal line is changed from at a low level to at a high level, only the LIN signal transmitting module is activated. In a case that the first output signal line of the processing module is at a low level, and the second output signal line of the processing module is at a high level, only the processing module is disabled.

In a case that the first output signal line of the processing module is at a high level, and the second output signal line of the processing module is at a high level, the enable input signal line of the LIN signal detection, reception and control module is changed from at a high level to at a low level, only the driver module and/or the detection module is disabled. In a case that the second output signal line of the processing module is at a high level, the enable input signal line of the LIN signal detection, reception and control module is changed from at a low level to at a high level, only the driver module and/or the detection module is activated.

Overall control commands are shown in Table 2.

Once a control command is received by the LIN signal detection, reception and control module, a module corresponding to the control command is activated or disabled, therefore, the slave node can be switched between various modes.

TABLE 2

| Control Command | Enable input signal line of the LIN signal detection, reception and control module | First output signal line of the processing module | Second output signal line of the processing module |
| --- | --- | --- | --- |
| Disable both the LIN signal transmitting module and the processing module | 1 to 0 | 0 | 0 |
| Disable only the LIN signal transmitting module | 1 to 0 | 1 | 0 |
| Activate only the LIN signal transmitting module | 0 to 1 | 0 or 1 | 0 |
| Disable only the processing module | 1 to 0 | 0 | 1 |
| Disable only the | 1 to 0 | 1 | 1 |

TABLE 2-continued

| Control Command | Enable input signal line of the LIN signal detection, reception and control module | First output signal line of the processing module | Second output signal line of the processing module |
|---|---|---|---|
| driver module or detection module | | | |
| Activate only the driver module or detection module | 0 to 1 | 0 or 1 | 1 |

Practically, the combination of signals described above is only illustrative, the signals performing a simultaneous disable, a separate disable or a separate activation may be other types of signals or other combinations of signals.

The sixth signal channel 6 may also only include one signal line, the processing module 12 and the LIN signal detection, reception and control module 11 may appoint a signal form together to distinguish different control commands. Alternatively, the different control commands may be distinguished by a combination of an appointed signal form on one signal line and a level signal on other signal line. In addition, besides the signals listed in Table 1 and Table 2, the sixth signal channel 6 may further include "a RESET (reset) output signal of the LIN signal detection, reception and control module", only when the RESET (reset) output signal of the LIN signal detection, reception and control module is at a high level, the control relationship in Table 1 and Table 2 can work.

The detection module 15 and/or the driver module 16 may return a signal to the processing module 12 via the third signal channel 3; the third signal channel 3 may be based on the Serial Peripheral Interface (Serial Peripheral Interface), and specifically, the third signal channel 3 may include a chip select signal line, a clock line, a data input line and a data output line; the processing module 12 may activate or hibernate the detection module 15 and/or the driver module 16 by writing a control command on the data input line. The third signal channel 3 may also be other communication interfaces such as INTER IC BUS (I2C).

In a case that the detection module 15 and/or the driver module 16 has a recognition function, it can determine that the control signal transmitted from the processing module 12 is used to activate or hibernate the detection module 12 and/or the driver module 16.

Specifically, the processing module 12 may be a 16-bit microprocessor such as MC9S08SC4, MC9S08SG4, MC9S08SG8, MC9S08SG16 produced by freescale. The LIN signal detection, reception and control module 11, the LIN signal transmitting module 13 and the power supply module 14 may be integrated into one integrated chip, such as TJA 1028 produced by NXP company. The driver module 15 and the detection module 15 may be a driver module, which may be a stepper motor driver module integrated with SPI interface, such as NCV 70501 produced by Onsemi company.

It should be noted that the chips given in the embodiment described above are just examples. Any chip having a digital processing function such as a single chip, a microprocessor, a microcontroller, ARM, or DSP is suitable for the processing module. Also, the processing module 12, the driver module 16 and the detection module 15 may not necessarily be a complete integrated chip, respectively. Any two or more of modules in the electronic control part 10 of the slave node according to the disclosure may be integrated into one integrated chip, even the whole electronic control part may be integrated into one integrated chip.

The disclosure may further provide a control method for an LIN slave node, including:
  recognizing, by an LIN signal detection, reception and control module 11, a wakeup signal (the wakeup signal is a bus dominate state meeting a requirement for the a length of time) on an LIN bus, and activating a processing module 12;
  receiving and forwarding a signal on the LIN bus by the LIN signal detection, reception and control module 11;
  generating, by the processing module 12, based on the signal, a control signal for activating an LIN signal transmitting module 13, or a control signal for disabling the LIN signal transmitting module 13 and/or the processing module 12; and
  activating, by the LIN signal detection, reception and control module 11, a control signal of the LIN signal transmitting module 13 or disabling the LIN signal transmitting module 13 and/or processing module 12 by controlling a state of a power supply module 14 for supplying power the LIN signal transmitting module 13 and the processing module 12 based on the control signal generated by the processing module 12.

In a case that an electronic control part 10 includes a function executing module, the control method for an LIN slave node includes:
  receiving and converting, by the LIN signal detection, reception and control module 11, a signal on the LIN bus and forwarding the converted signal;
  generating, by the processing module 12, based on the signal, a control signal for activating the LIN signal transmitting module 13 and/or the function executing module, or a control signal for disabling the LIN signal transmitting module 13 and/or the processing module 12 and/or the function executing module, where one, two or all of the LIN signal transmitting module 13, the processing module 13 and the function executing module are disabled; and
  activating, by the LIN signal detection, reception and control module 11, the LIN signal transmitting module 13 and/or the function executing module, or disabling the LIN signal transmitting module 13 and/or the processing module 12 and/or the function executing module by controlling a state of the power supply module 14 for supplying power to the LIN signal transmitting module 13, the processing module 12 and the function executing module based on the control signal generated by the processing module 12, where one, two or all of LIN signal transmitting module 13, the processing module 12 and the function executing module are disabled.

In a case that the function executing module includes a detection module or a driver module, the control method for LIN slave node includes:
  receiving and forwarding, by the LIN signal detection, reception and control module 11, a signal on the LIN bus;
  generating, by the processing module 12, based on the signal, a control signal for activating the LIN signal transmitting module 13 and/or the detection module 15, or a control signal for disabling the LIN signal transmitting module 13 and/or the processing module 12 and/or the detection module 15;
  activating, by the LIN signal detection, reception and control module 11, the LIN signal transmitting module 13 and/or the detection module 15 or the driver module 16, or disabling the LIN signal transmitting module 13 and/or the processing module 12 and/or the detection module 15 by controlling a state of the power supply module for supplying power 14 to the LIN signal transmitting module 13, the processing module 12 and the detection module 15 based on the control signal generated by the processing module.

Alternatively, in a case that the function executing module is the driver module rather than the detection module, the control method for an LIN slave node is the same as the above method.

Alternatively, in a case that the function executing module includes the detection module and the driver module, the control method for an LIN slave node includes:

receiving, by the LIN signal detection, reception and control module 11, a signal on the LIN bus by;

generating, by the processing module 12, based on the signal, a control signal for activating the LIN signal transmitting module 13, the driver module 16 and/or the detection module 15, or a control signal for disabling the LIN signal transmitting module 13 and/or the processing module 12 and/or the driver module 16 and/or the detection module 15; and activating, by the LIN signal detection, reception and control module 11, the LIN signal transmitting module 13, the function executing module or disabling the LIN signal transmitting module 13 and/or the processing module 12 and/or the function executing module by controlling a state of a power supply module 14 for supplying power the LIN signal transmitting module 13, the processing module 12 and the function executing module based on the control signal generated by the processing module 12.

In the LIN, based on that a state of the LIN signal detection, reception and control module 11, the processing module 12, the LIN signal transmitting module 13 and the function executing module is an activated state, a disabled state or a hibernated state, the LIN slave node has five operation modes and may be converted between the five operation modes.

1. In a sleep mode, the LIN signal detection, reception and control module 11 is in the activated state, the function executing module is in the hibernated state or the disabled state, the processing module and the LIN signal transmitting module 13 are in the disabled state.

2. In a first quasi-sleep mode, the LIN signal detection, reception and control module 11 and the processing module 12 are in the activated state, the function executing module is in the hibernated state or the disabled state, the LIN signal transmitting module 13 is in the disabled state.

3. In a second quasi-sleep mode, the LIN signal detection, reception and control module 11, the processing module 12 and the LIN signal transmitting module 13 are in the activated state, and the function executing module is in the hibernated state or the disabled state.

4. In a quasi-operation mode, the LIN signal transmitting module 13 is in the disabled state, and other modules are in the activated state;

5. In a complete operation mode, all modules are in the activated state.

Figure 7:
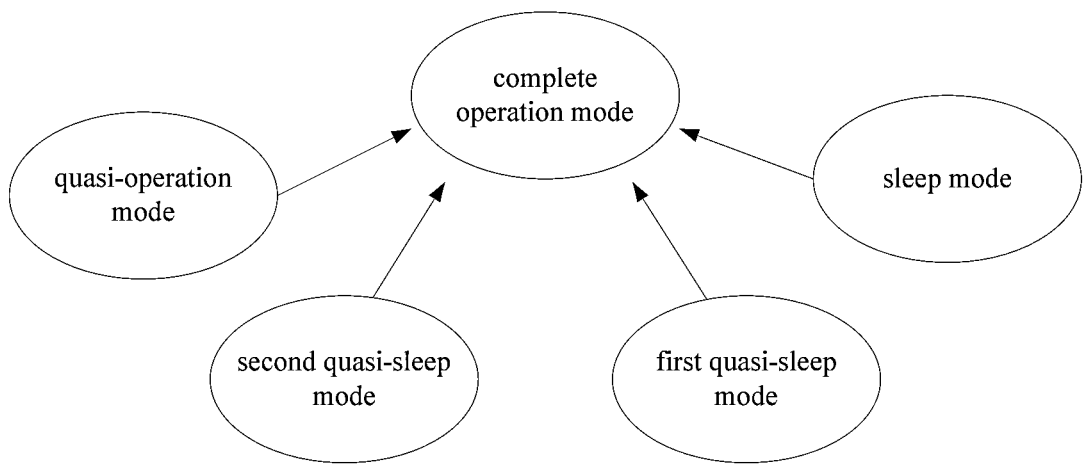
FIG. 7 is a schematic diagram in which an LIN slave node according to an embodiment of the disclosure is switched to a complete operation mode from another mode.

A reference is made to FIG. 7 which is a schematic diagram in which the LIN slave node is switched to the complete operation mode from other modes. In the LIN, in a case that the LIN slave is required to be switched to the complete operation mode, the LIN signal detection, reception and control module 11, the processing module 12, the LIN signal transmitting module 13 and the function executing module can be switched to the complete operation mode from the sleep mode, the first quasi-sleep mode, the second quasi-sleep mode or the quasi-operation mode under control of the processing module 12.

In a case that the LIN slave node is in the sleep mode, a related module is controlled to be activated under control of the processing module 12, in this way, the LIN slave node may be directly switched to any one of the first quasi-sleep mode, the second quasi-sleep mode, the quasi-operation mode or the complete operation mode from the sleep mode.

Figure 3:
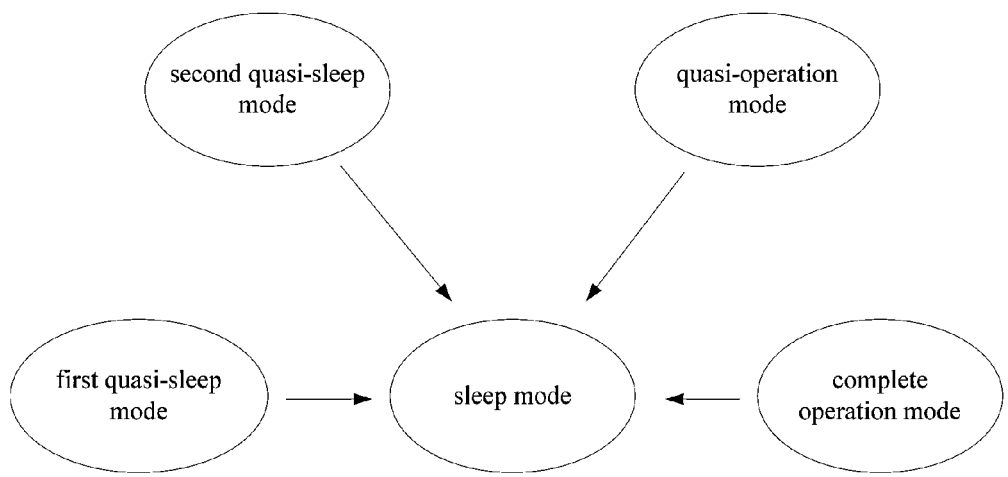
FIG. 3 is a schematic diagram in which an LIN slave node according to an embodiment of the disclosure is switched to a sleep mode from another mode.

A reference is made to FIG. 3 which is a schematic diagram in which the LIN slave node is switched to the sleep mode from other modes. In the LIN, the LIN slave node may be directly switched to the sleep mode in a case that a preset condition for the sleep mode is met. The preset condition for the sleep mode is as follows.

The LIN slave node is switched to the sleep mode after Power On Self Test (POST) is passed; the LIN slave node is switched to the sleep mode after POST is passed and a preset length of time (based on the LIN protocol, the preset length of time such as 4 second to 10 second may be set according to needs, a definition for the preset length of time below is the same) is elapsed; the LIN slave node is switched to the sleep mode in a case that the LIN slave node does not receive a signal from the LIN bus within the preset length of time and the LIN slave node only requires maintaining fewest modules to operate; the LIN slave node is switched to the sleep mode in a case that the LIN slave node receives an LIN bus hibernation instruction or the LIN slave node only requires maintaining fewest modules to operate; the LIN slave node is switched to the sleep mode in a case that the LIN slave node operates in the complete operation mode and the LIN slave node does not receive any operation instruction from the LIN bus within a preset length of time after completing an action required by an LIN master node; or the LIN slave node maintains to be in the sleep mode before the LIN signal detection, reception and control module recognizes that a signal generated on the LIN bus is a wakeup signal in a case that the LIN slave node operates in the sleep mode.

The complete operation mode is all modules are in the activated mode. When a bus hibernation instruction is received by the processing module 12, the processing module 12 transmits a control signal to the LIN signal detection, reception and control module 11 via the sixth signal channel 6, and the LIN signal detection, reception and control module 11 outputs a signal to the power supply module 14 after receiving the signal transmitted from the processing module 12, the power module 14 disables the LIN signal transmitting module 13, the function executing module and the processing module 12 by disconnecting the second power supply channel P2, the fourth power supply channel P4 and the third power supply channel P3, therefore, the whole slave node is switched to the sleep mode. The processing module 12 may also hibernate the function executing module via the third signal channel 3, and then disable the LIN signal transmitting module 13 and the processing module 12 successively as above.

As a particular embodiment, for an executor, such as an electronic expansion valve and a damper actuator, employing the disclosure, after the driver module 16 controls a component to rotate to a specified position and returns a signal to the LIN bus, and a particular length of time is elapsed and the executor does not perform any action within the particular length of time, the whole slave node may only maintain fewest modules to be in an operation state, this is, the whole salve node is in the sleep mode, power consumption of the whole slave node is the lowest in the sleep mode.

Figure 4:
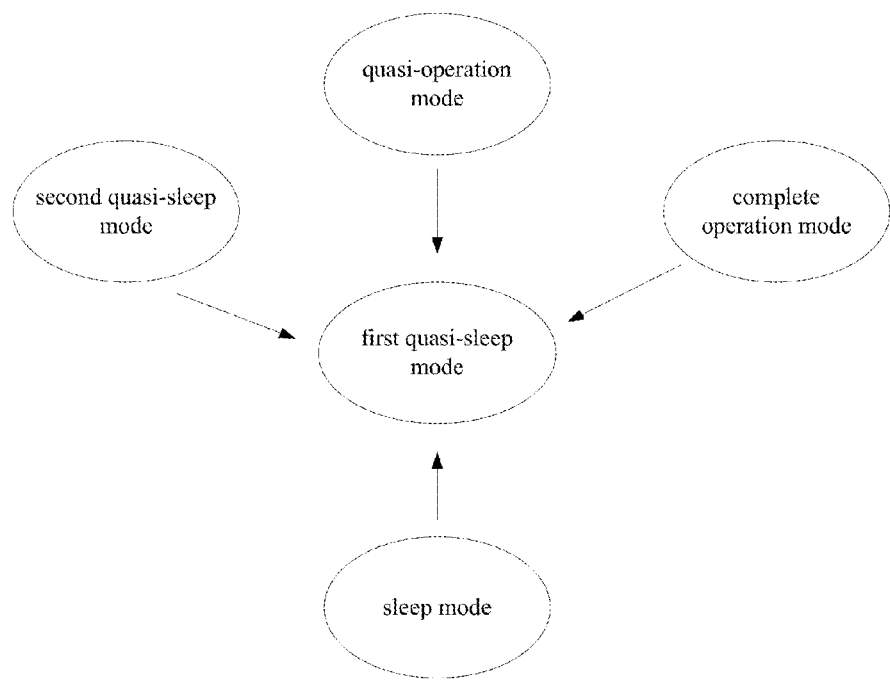
FIG. 4 is a schematic diagram in which an LIN slave node according to an embodiment of the disclosure is switched to a first quasi-sleep mode.

A reference is made to FIG. 4 which is a schematic diagram in which the LIN slave node according to the embodiment of the disclosure is switched to the first quasi-sleep mode. In the LIN, the LIN slave node may be switched to the first quasi-sleep mode in a case that a preset condition for the first quasi-sleep mode is met, the preset condition for the first quasi-sleep mode is as follows.

In a case that the LIN slave node operates in the sleep mode, if the LIN signal detection, reception and control module 11 recognizes that a signal generated on the LIN bus is a bus wakeup signal, the LIN signal detection, reception and control module 11 controls the power supply module 14 to supply power to the processing module 12, the processing module 12 is then in the operation state, and the LIN slave node is switched to the first quasi-sleep mode.

Alternatively, in a case that the LIN slave node operates in the first quasi-sleep mode, if there is a signal on the LIN bus, the LIN signal detection, reception and control module 11 receives and convert the signal, and then transmit the converted signal to the processing module 12, if the processing module 12 determines that it is not require to activate or disable any module, the LIN slave node maintains to be in the first quasi-sleep mode.

Alternatively, in a case that the LIN slave node operates in the second quasi-sleep mode, if it is not required to return a signal to the LIN bus, the LIN signal transmitting module 13 is disabled under control of the processing module 12, and the LIN slave node is switched to the first quasi-sleep mode.

Alternatively, in a case that the LIN slave node operates in the quasi-operation mode, if the function executing module is not required to maintain to be in the activated state, under control of the processing module 12, the function executing module is switched to the hibernated state or the disabled state, and the LIN slave node is switched to the first quasi-sleep mode; alternatively, in a case that the LIN slave node operates in the complete operation mode, if it is not required to return the signal to the LIN bus, and the function executing module is not required to maintain to be in the activated state, under control of the processing module 12, the LIN signal transmitting module 13 is disabled, the function executing module is switched to the hibernated state or the disabled state, and the LIN slave node is switched to the first quasi-sleep mode.

Figure 5:
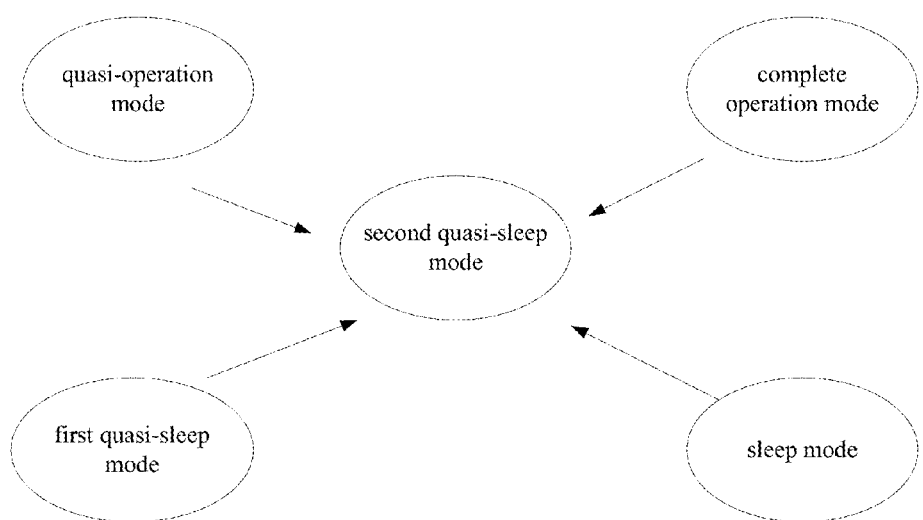
FIG. 5 is a schematic diagram in which an LIN slave node according to an embodiment of the disclosure is switched to a second quasi-sleep mode.

A reference is made to FIG. 5 which is a schematic diagram in which the LIN slave node according to the embodiment of the disclosure is switched to the second quasi-sleep mode. In the LIN, the LIN slave node is switched to the second quasi-sleep mode in a case that a preset condition for the second quasi-sleep mode is met. The preset condition for the second quasi-sleep mode is as follows.

In a case that the LIN slave node operates in the first quasi-sleep mode, if there is a signal on the LIN bus, the LIN signal detection, reception and control module receives and converts the signal and then transmits the converted signal to the processing module 12, and if the processing module 12 determines that only the LIN signal transmitting module 13 is required to be turned on, the LIN signal transmitting module 13 is activated under control of the processing module 12, and the LIN slave node is switched to the second quasi-sleep mode.

Alternatively, in a case that the LIN slave node operates in the second quasi-sleep mode, if there is a signal on the LIN bus, the LIN signal detection, reception and control module 11 receives and converts the signal and then transmits the converted signal to the processing module 12, and if the processing module 12 determines that it is not required to activate or disable any module, the LIN slave node maintains to be in the second quasi-sleep mode.

Alternatively, in a case that the LIN slave node operates in the quasi-operation mode, if the function executing module is not required to maintain to be in the activated state, and the processing module 12 is required to return a signal to the LIN bus, the function executing module is switched to the hibernated state or the disable state and the LIN signal transmitting module 13 is activated under control of the processing module, and the LIN slave node is switched to the second quasi-sleep mode.

Alternatively, in a case that the LIN slave node operates in the complete operation mode, if the function executing module is not required to maintain to be in the activated state, the function executing module is switched to the hibernated state or the disabled state under control of the processing module 12, the LIN slave node is switched to the second quasi-sleep mode.

Figure 6:
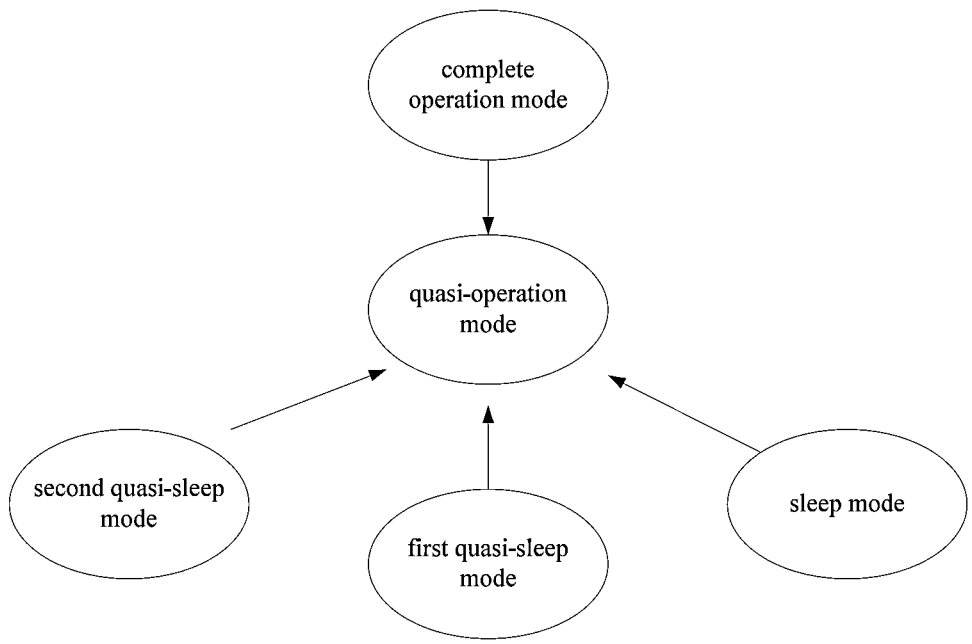
FIG. 6 is a schematic diagram in which an LIN slave node according to an embodiment of the disclosure is switched to a quasi-operation mode.

A reference is made to FIG. 6 which is a schematic diagram in which the LIN slave node according to the embodiment of the disclosure is switched to the quasi-operation mode. In the LIN, the LIN slave node is switched to the quasi-operation mode in a case that a preset condition for the quasi-operation mode is met by the embodiment of the invention, for example.

In a case that the LIN slave node operates in the first quasi-sleep mode, if the function executing module is required to be activated, the function executing module is activated under control of the processing module 12, and the LIN slave node is switched to the quasi-operation mode.

Alternatively, in a case that the LIN slave node operates in the second quasi-sleep mode, if the function executing module is required to be activated, and it is not required to return a signal to the LIN bus, the function executing module is activated and the LIN signal transmitting module 13 is disabled under control of the processing module 12, and the LIN slave node is switched to the quasi-operation mode.

Alternatively, in a case that the LIN slave node operates in the quasi-operation mode, if the function executing module keeps in the operation state, and the slave node is not required to return a signal to the LIN bus, the LIN slave node maintains to be in the quasi-operation mode.

Alternatively, in a case that the LIN slave node operates in the complete operation mode, if it is not required to return a signal to the LIN bus, the LIN signal transmitting module 13 is disabled under control of the processing module 12, and the LIN slave node is switched to the quasi-operation mode.

Figure 8:
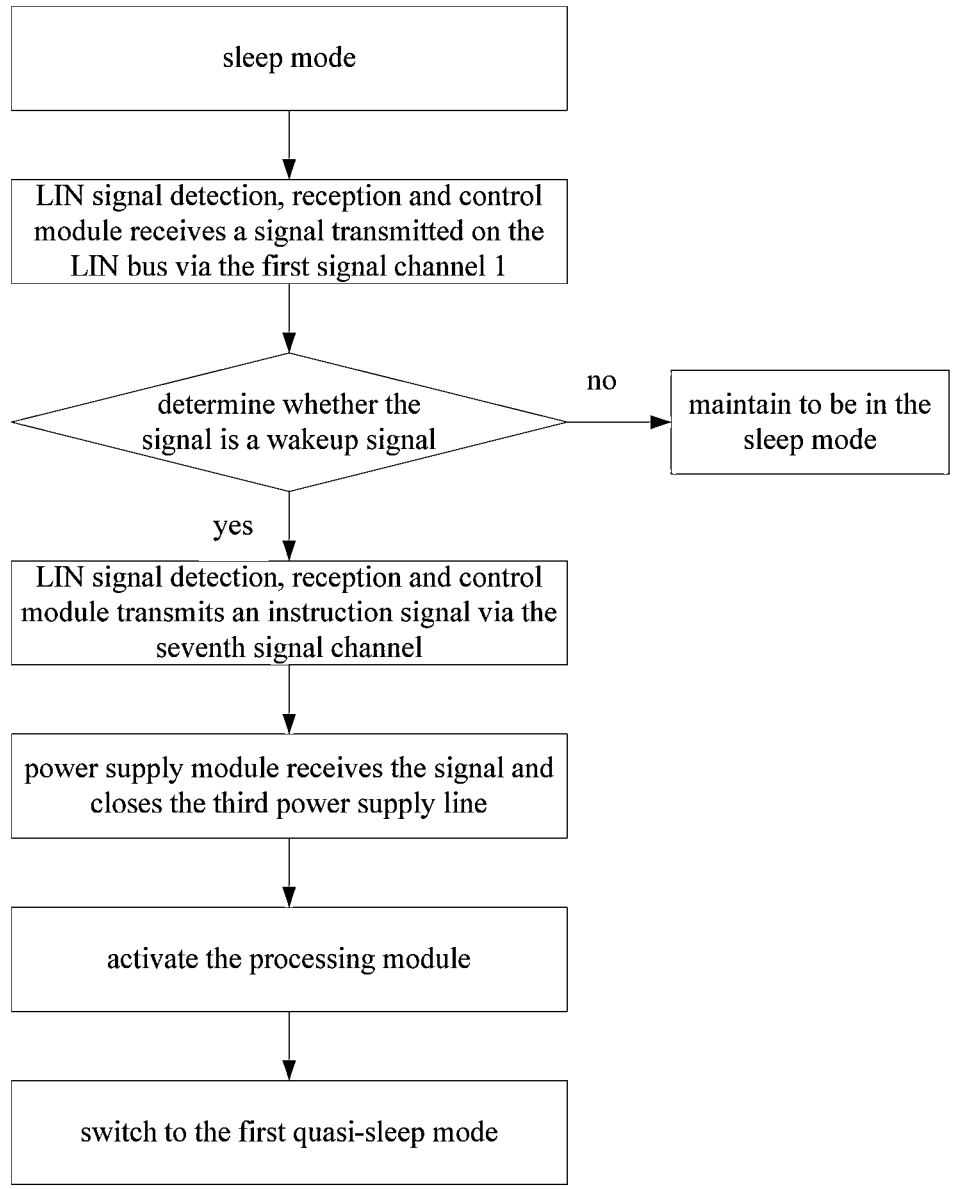
FIG. 8 is a schematic flow diagram of switching an LIN slave node according to an embodiment of the disclosure from a sleep mode to the first quasi-sleep mode.

A reference is made to FIG. 8 which is a schematic flow diagram of converting the LIN slave node according to the embodiment of the disclosure from being in the sleep mode to being in the first quasi-sleep mode. In a case that the LIN slave node operates in the sleep mode, the LIN signal detection, reception and control module 11 receives a signal transmitted from the LIN bus via the first signal channel 1.

First, it is determined whether the signal is a wakeup signal, and the LIN slave node maintains to be in the sleep mode in a case that it is determined that the signal is not the wakeup signal; the LIN signal detection, reception and control module 11 transmits an instruction signal to the power supply module 14 via the seventh signal channel 7 in a case that it is determined that the signal is the wakeup signal, the power supply module 14 turn on the third power supply line P3 when receiving the instruction signal.

The processing module 12 is activated, that is, the processing module 12 is in the operation state, the LIN slave node is switched to the first quasi-sleep mode.

Figure 9:
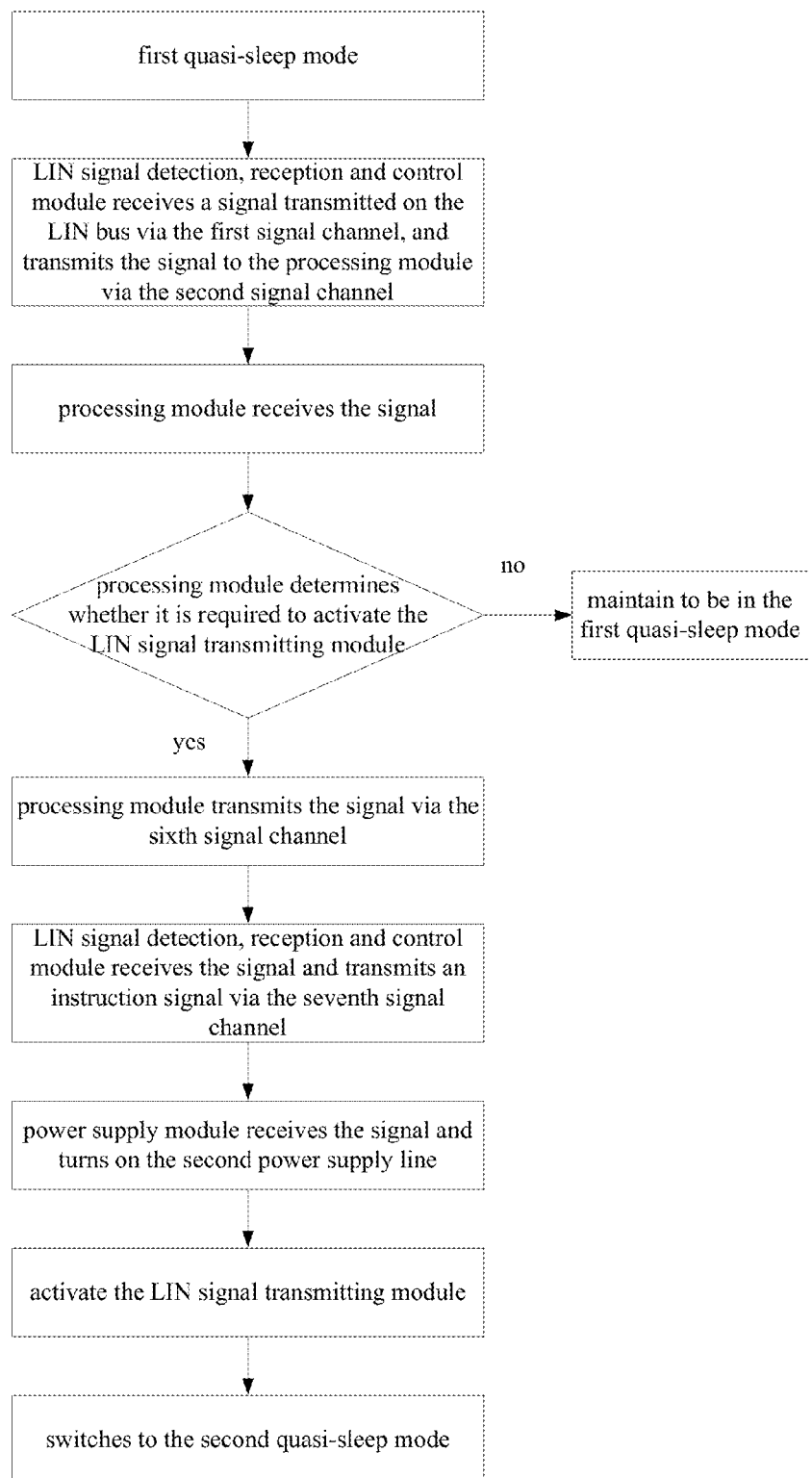
FIG. 9 is a first schematic flow diagram of switching an LIN slave node according to an embodiment of the disclosure from the first quasi-sleep mode to the second quasi-sleep mode.

A reference is made to FIG. 9 which is a first schematic flow diagram of converting the LIN slave node according to the embodiment of the disclosure from being in the first quasi-sleep mode to being in the second quasi-sleep mode. The LIN signal slave node operates in the first quasi-sleep mode, the LIN signal detection, reception and control module 11 receives a signal on the LIN bus via the first signal channel 1, and transmits the signal to the processing module 12 via the second signal channel 2. The processing module 12 determines whether it is required to activate the LIN signal transmitting module 13 after receiving the signal; in a case that the processing module 12 determines that it is required to activate the LIN signal transmitting module 13, the LIN signal slave node maintains to be in the first quasi-sleep mode; in a case that the processing module 12 determines that it is required to activate the LIN signal transmitting module 13, the processing module 12 transmits a signal via the sixth signal channel 6, and the LIN signal detection, reception and control module 11 receives the signal and then transmits an instruction signal to the power supply module 14 via the seventh signal channel 7, the power supply module 14 receives the instruction signal and then turn on the second power supply line P2. Therefore, the LIN signal transmitting module is activated, that is, the LIN signal transmitting module is in the operation state, the LIN slave node is switched to the second quasi-sleep mode.

Figure 10:
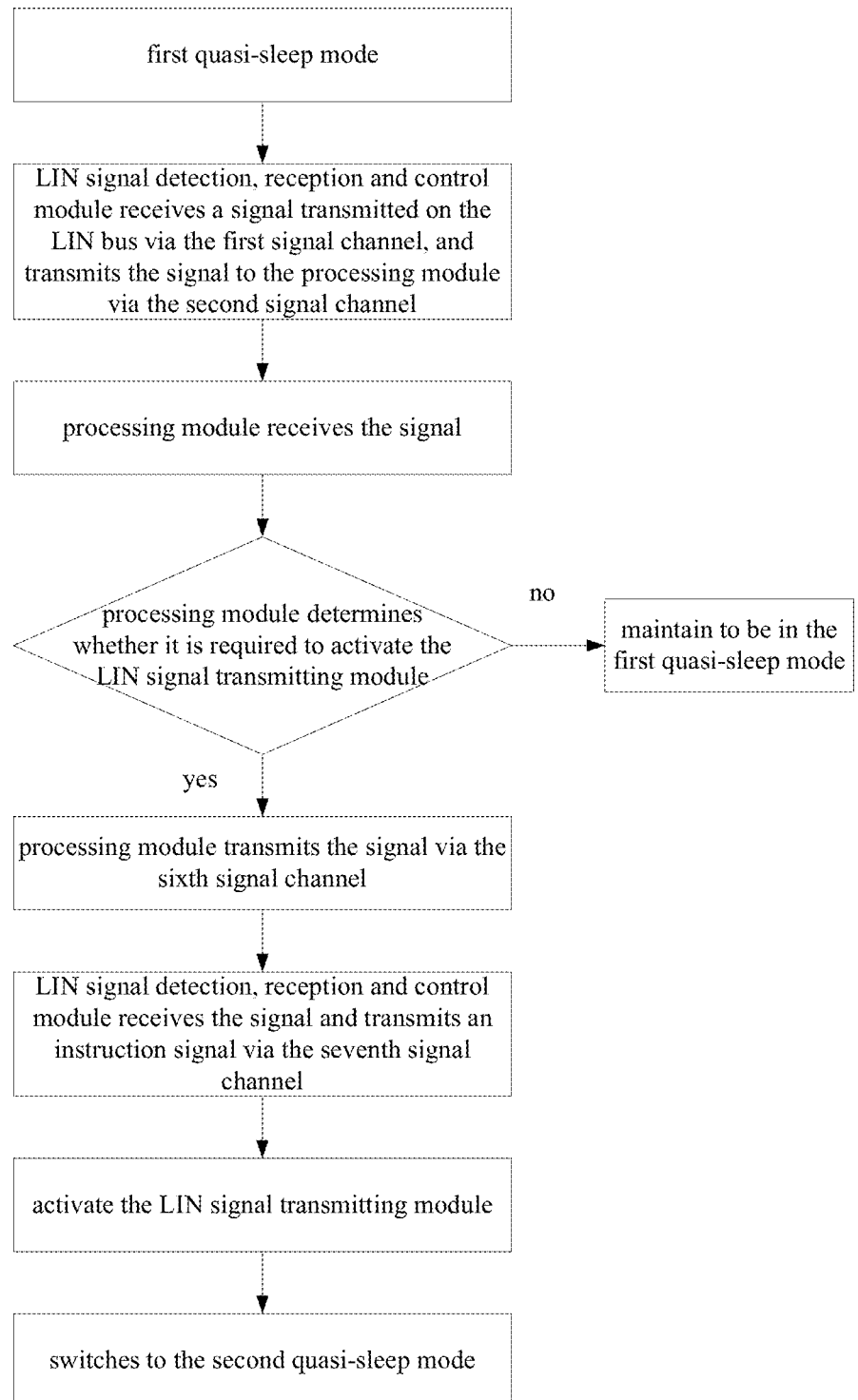
FIG. 10 is a second schematic flow diagram of switching an LIN slave node according to an embodiment of the disclosure from the first quasi-sleep mode to the second quasi-sleep mode.

A reference is made to FIG. 10 which is a second schematic flow diagram of converting the LIN slave node according to the embodiment of the disclosure from being in the first quasi-sleep mode to being in the second quasi-sleep mode. The LIN slave node operates in the first quasi-sleep mode, the LIN signal detection, reception and control module 11 receives a signal on the LIN bus via the first signal channel 1, and transmits the signal to the processing module 12 via the second signal channel 2.

The processing module 12 determines whether it is required to activate the LIN signal transmitting module 13 after receiving the signal. In the case that the processing module 12 determines that it is required to activate the LIN signal transmitting module 13, the processing module 12 transmits a control signal via the sixth signal channel 6, the LIN signal detection, reception and control module 11 receives the control signal and transmits an instruction signal via the eighth signal channel 8, the LIN signal transmitting module 13 is then activated, that is, the LIN signal transmitting module 13 is in the operation state, the LIN slave node is switched to the second quasi-sleep mode; in a case that the processing module 12 determines that it is not required to activate the LIN signal transmitting module 13, the LIN slave node maintains to be in the first quasi-sleep mode.

In another embodiment of the disclosure, besides the disabled state and the activated state, the processing module 12 and the function executing module further have an intermediate state, i.e. the hibernated state (in the hibernated state, the processing module 12 and the function executing module are in a state in which both do not operate, but are supplied power). The processing module 12 can be switched to or from the hibernated state, and the function executing module is switched to or from the hibernated state under control the processing module 12. Based on the concept of the disclosure, it can be made easily by those skilled in the art that more modes of the LIN slave node can be realized by introducing the hibernated state of various modules, the more modes are as several embodiments introduced below.

Figure 11:
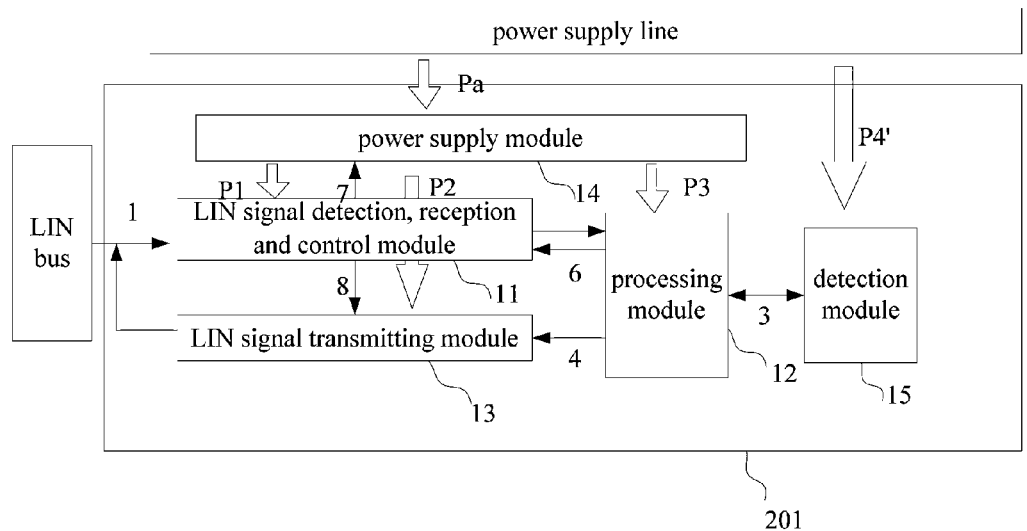
FIG. 11 is a schematic diagram of an LIN slave node according to another embodiment of the disclosure.
Figure 12:
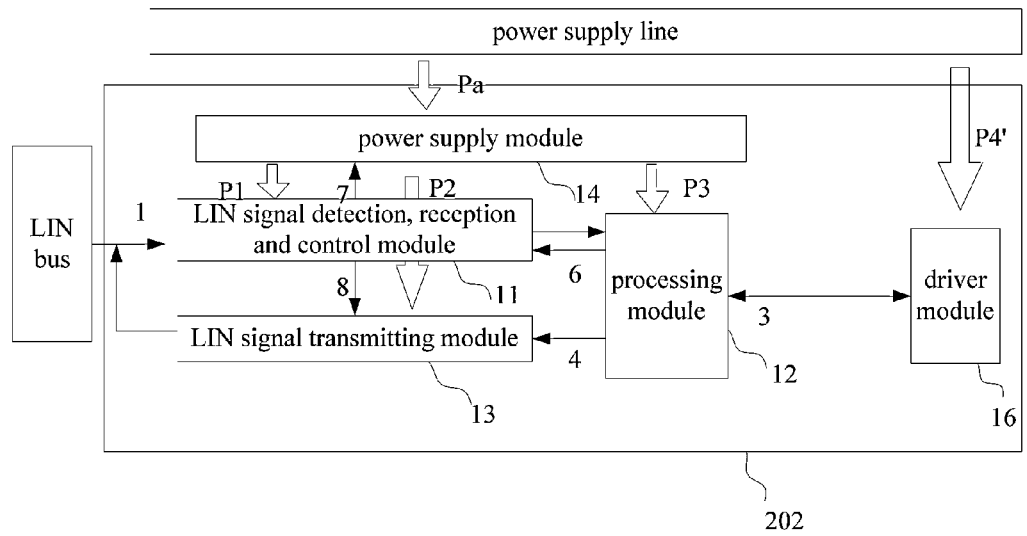
FIG. 12 is a schematic diagram of an electronic control part of an LIN slave node according to another embodiment.
Figure 13:
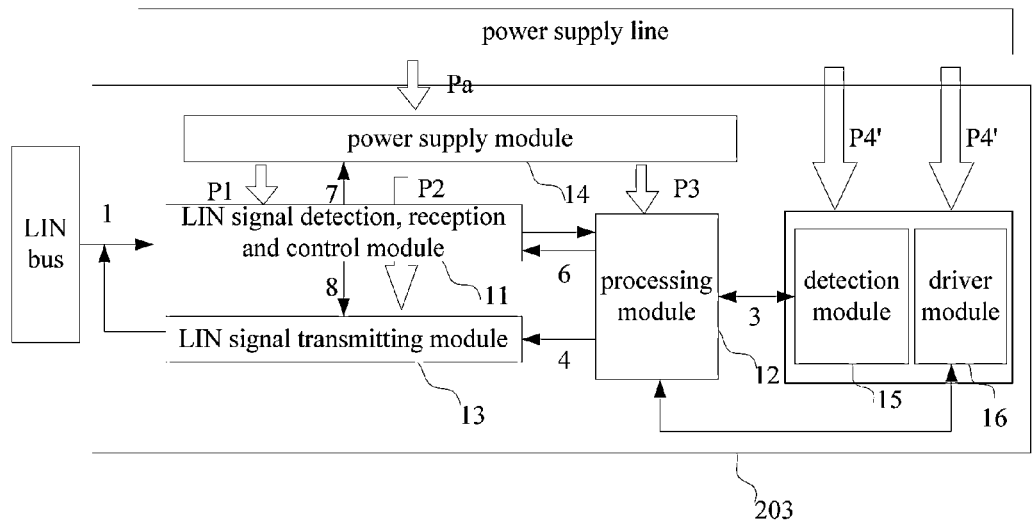
FIG. 13 is a schematic diagram of an electronic control part of an LIN slave node according to yet another embodiment.

FIG. 11 is a schematic diagram of an embodiment of an LIN slave node 201, a difference between the LIN slave node in FIG. 11 and the LIN slave node in FIG. 2a is that the detection module in FIG. 11 is supplied power directly via a power supply line P4'. FIG. 12 is a schematic diagram of an electronic part of an LIN slave node 202 according to another embodiment, a controlled mechanical part is not shown in FIG. 12. A difference between the LIN slave node in FIG. 12 and the LIN slave node in FIG. 2b is that the driver module is supplied power directly by a power supply line P4'. FIG. 13 is a schematic diagram of an electronic part of an LIN slave node 202 according to yet another embodiment, a controlled part is not shown in FIG. 13. A difference between the LIN slave node in FIG. 13 and the LIN slave node in FIG. 2c is that the detection module and the driver module are supplied power directly by a power supply line P4'. For these embodiments, the function executing module may be in the hibernated state or the activated state but may not be in the disabled state under control of the signal channel 3. Each module in FIG. 11, FIG. 12 and FIG. 13 are the same as those in the embodiments shown in FIG. 2a, FIG. 2b and FIG. 2c, which are not described here anymore.

In the LIN bus, the LIN slave node according to these embodiments also includes five modes, a difference between the five modes and the five modes according to the embodiments shown in FIG. 2a, FIG. 2b and FIG. 2c is that the function executing module in FIG. 11, FIG. 12 and FIG. 13 does not have the disabled state.

In addition, in the embodiments shown in FIG. 2a, FIG. 2b and FIG. 2c, FIG. 11, FIG. 12 and FIG. 13, the processing module 12 may also have the hibernated state, rather than the disabled state. The processing module 12 may be switched to the hibernated state. In the hibernated state, the processing module may only maintain necessary parts to be in the operation state, and turn off unnecessary parts, and therefore, power consumption may be very low. For example, in a case that the processing module is a microcontroller MC9S08SC4, the microcontroller MC9S08SC4 has a stop3 state and after a register is configured, the microcontroller MC9S08SC4 is switched to the stop3 state when executing asm (stop;). In the stop3 state, a CPU clock stops, and modules such as ADC (analog to digital controller), I2C are turned off, therefore, the power consumption is very low; after the microcontroller MC9S08SC4 is switched to the stop3 state, an I/O state, the register and a logical state of the controller and content in RAM are maintained, therefore, control of the microcontroller to the LIN signal detection, reception and control module and the function executing module is not influenced before the microcontroller is switched to the stop3 state; after the microcontroller is switched to the stop3 state, an interruption signal such as an interruption signal from SCI (serial communication interface) switches the controller from the stop3 state to the activated state. Therefore, the stop3 state may be served as a hibernated state of the processor, when a wakeup signal from the LIN bus is received, and the LIN signal detection, reception and control module 11 converts the wakeup signal and inputs as the interruption signal to the processing module, and therefore activates the processing module in the hibernated state.

Specifically, in the embodiments shown in FIG. 2a, FIG. 2b, FIG. 2c, FIG. 11, FIG. 12 and FIG. 13, after the LIN signal detection, reception and control module 11 receives and converts a hibernation command from the LIN bus, and then transmits the converted hibernation command to the processing module 12, and the processing module 12 analyzes that the command is a hibernation command, or after the processing module determines that the length of time within which there is no signal on the LIN bus exceeds a preset length of time, the processing module 12 controls the LIN slave node to be switched to a low power consumption state. Practically, the processing module 12 controls the LIN signal detection, reception and control module 11 to disable the LIN signal transmitting module, and controls the function executing module to be switched to the hibernated state via the signal channel 3, or the processing module 12 controls the LIN signal detection, reception and control module 11 to disable the LIN signal transmitting module 13 and the function executing module, and then the processing module controls itself to be switched to the hibernated state.

In the LIN protocol, for example, when the length of time within which the LIN bus is maintained to be at a low level is 250 μs to 5 ms, it is regarded in the state that there is a wakeup signal. After he wakeup signal is received by the LIN signal detection, reception and control module, the wakeup signal is transmitted as the interruption signal via the signal channel 2, to activate the processing module 2. After the processing module 12 is activated, the processing module 12 controls other modules, which is described in detail above, and not described anymore.

Similarly, based on states of various modules, the processing module 12 and the LIN signal detection, reception and control module 11 control the LIN slave node to be switched between the following modes.

In a sleep mode, the LIN signal detection, reception and control module 11 is in the activated state, the processing module 12 is in the hibernated state, the function executing module is in the hibernated state or the disabled state, and the LIN signal transmitting module 13 is in the disabled state.

In a first quasi-sleep mode, the LIN signal detection, reception and control module 11 is in the activated state, the processing module 12 is in the activated state, the function executing module is in the hibernated state or the disabled state, and the LIN signal transmitting module 13 is in the disabled state.

In a second quasi-sleep mode, the LIN signal detection, reception and control module 11 is in the activated state, the processing module 12 is in the activated state, the LIN signal transmitting module 13 is in the activated state, and the function executing module is in the hibernated state or the disabled state.

In a quasi-operation mode, the LIN signal detection, reception and control module 11 is in the activated state, the processing module 12 is in the activated state, the function executing state is in the activated state, and the LIN signal transmitting module 13 is in the disabled state.

In a complete operation mode, the LIN signal detection, reception and control module is in the activated state, the processing module 12 is in the activated state, the LIN signal transmitting module 13 is in the activated state, the function executing module is in the activated state.

In the embodiment, since the processing module 12 does not have the disabled state, the sleep mode in the embodiment is different from the sleep mode described above. Correspondingly, the LIN slave node switching from the sleep mode to the first quasi-sleep mode is achieved by the LIN signal detection, reception and control module 11 directly activating the processing module 12 via the signal channel 2. The LIN slave node switching from other modes to the sleep mode is achieved by the processing module 12 controlling itself to be switched to the hibernated state, which is different from the way of converting any one of the first quasi-sleep mode, the second quasi-sleep mode, the quasi-operation mode and the complete operation mode to the sleep mode in the embodiments described above.

Figure 14:
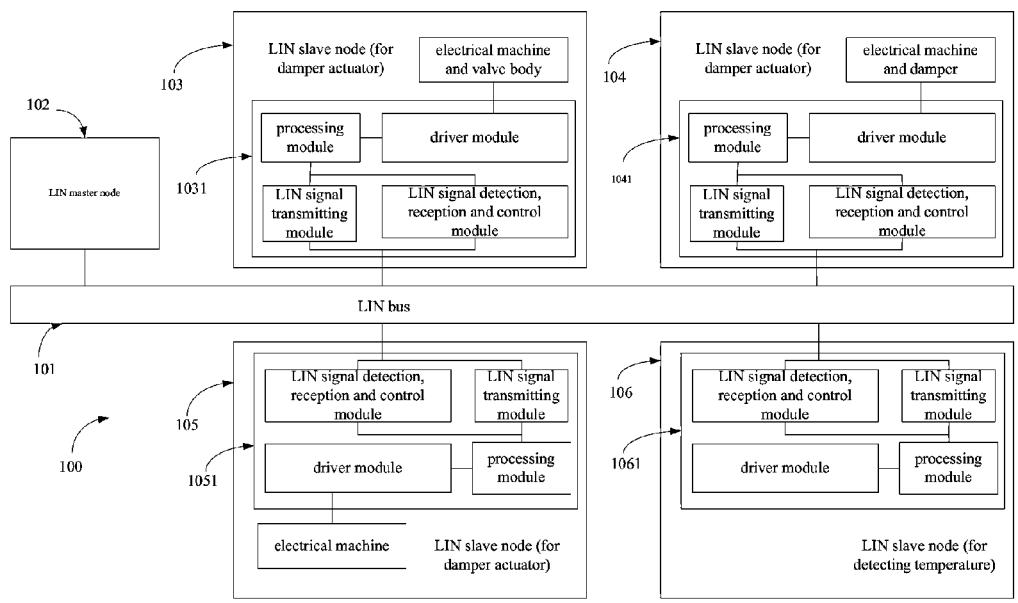
FIG. 14 is a partially schematic diagram of an LIN according to an embodiment of the disclosure.

FIG. 14 is a partially schematic diagram of an LIN according to an embodiment. The schematic diagram shows a part of a Heating Ventilation Air Conditioning (HVAC) LIN in a car. The LIN slave node in the schematic diagram may also be used to other LIN besides the HVAC LIN such as an LIN including one or more functions of seat adjustment, car window adjustment, skylight control, remote key control, adaptive front lighting adjustment. Also, the number of slave nodes in an LIN may be greater or less than the number of slave nodes in the schematic diagram.

In the following, an LIN is explained below by taking the LIN shown in FIG. 14 as an example. The LIN 100 is a single-line serial communication network, which includes an LIN bus 101, an LIN master node 102, an LIN slave node 103 used as an electronic expansion valve (EXV), an LIN slave node 104 used as a damper actuator (Flap), an LIN slave node 105 used as a Blower (Blower) and an LIN slave node 106 for detecting temperature. The LIN slave node 103 used as the electronic expansion valve (EXV) includes an electronic control part 1031, the LIN slave node 104 used as the damper actuator (Flag) includes an electronic control part 1041, the LIN slave node 105 used as a Blower (Blower) includes an electronic part 1051, and the LIN slave node 106 for detecting temperature includes an electronic control part 1061. The LIN master nodes 102 and each LIN slave node are connected electrically to the LIN bus via LIN lines. Based on an actual function of the slave nodes, the slave nodes suitable for each embodiment mentioned above include an electronic control part, and the electronic control part includes an LIN signal detection, reception and control module, a processing module, an LIN signal transmitting module and a function executing module. The function executing module for the slave node for detecting temperature is a temperature detecting module, and the function executing module for other three slave nodes is a driver module.

The master node 102 in the LIN 100 transmits an instruction to each slave node via the LIN bus, each LIN slave node executes a corresponding operation after receiving the instruction. Each module in the LIN slave node operates in the same way as the LIN slave node above, and the operation mode of the LIN slave node is the same as the control method for the LIN slave node above, which are not described here anymore.

In this way, in the LIN having the LIN slave node according to the disclosure, a state of each module may be determined according to actual needs, by which power consumption of each module and power consumption of each node can be reduced, and therefore power consumption of the whole LIN can be reduced.

The foregoing is a detailed description of the disclosure having particularity. It should be understood by those skilled in the art that the description in the embodiments are only exemplified, and all changes made without departing from the real spirit and scope of the disclosure will fall within the scope of protection of the disclosure. The scope of protection of the disclosure is defined by the claims, and is not defined by the above description of the embodiments.

The invention claimed is:

1. A control system for a Local Interconnect Network, LIN, slave node, comprising an electronic control part,
   wherein the electronic control part comprises an LIN signal detection, reception and control module, a processing module connected to the LIN signal detection, reception and control module and an LIN signal transmitting module connected to the processing module; wherein the electronic control part further comprises a processor and a memory having a processor-executable instruction stored therein, and the instruction when executed by the processor, configure the processor to:

control the LIN signal detection, reception and control module to transmit a signal detected on an LIN bus to the processing module;

control the processing module to analyze the signal to obtain an analysis result, and transmit a feedback signal corresponding to the analysis result to the LIN bus by the LIN signal transmitting module;

control the LIN signal transmitting module to output the feedback signal output from the processing module to the LIN bus;

control the processing module to, based on the obtained analysis result, generate a control signal for activating the LIN signal transmitting module and transmit the control signal to the LIN signal detection, reception and control module, or generate a control signal for disabling the LIN signal transmitting module and/or the processing module and transmit the control signal to the LIN signal detection, reception and control module; and control the LIN signal detection, reception and control module to activate the processing module based on a wakeup signal on the LIN bus, and to activate the LIN signal transmitting module or disable the LIN signal transmitting module and/or the processing module based on the control signal from the processing module.

2. The control system for the LIN slave node according to claim 1, wherein in a case that a hibernation instruction from the LIN bus is received by the LIN signal detection, reception and control module, or a period within which there is no signal on the LIN bus exceeds a preset length of time, or the processing module determines that a preset condition for switching the LIN slave node to a sleep mode is met, the processing module controls the LIN signal detection, reception and control module to disable the LIN signal transmitting module and the processing module; or the processing module controls the LIN signal detection, reception and control module to disable the LIN signal transmitting module and switch the processing module to a hibernated state;

when the wakeup signal is received, the LIN signal detection, reception and control module activates the processing module in a disabled state, or the wakeup signal activates the processing module in the hibernated state; and the processing module controls the LIN signal detection, reception and control module to activate the LIN signal transmitting module; or the processing module controls, based on a received signal, the LIN signal detection, reception and control module to activate the LIN signal transmitting module or maintain the LIN signal transmitting module to be in the disabled state.

3. The control system for the LIN slave node according to claim 1, wherein the electronic control part further comprises a function executing module, the processor is configured to control the function executing module to execute an instruction output from the processing module and return a feedback signal, the function executing module has an activated state, the hibernated state and the disabled state, the function executing module is connected to the processing module;

wherein the processor is configure the processing module to directly activate or hibernate the function executing module, or the LIN signal detection, reception and control module is configured to activate or disable the function executing module based on the control signal from the processing module.

4. The control system for the LIN slave node according to claim 3, wherein the LIN slave node further comprises a power supply module connected to an external power supply, the processor is configured the power supply module to supply power to the LIN signal detection, reception and control module, the LIN signal transmitting module, the processing module and the function executing module; the LIN signal detection, reception and control module activates or disables the LIN signal transmitting module, the processing module and the function executing module by controlling the power supply module to supply power to the LIN signal transmitting module, the processing module and the function executing module or not; or the LIN signal detection, reception and control module directly controls the LIN signal transmitting module to be disabled or activated based on the control signal transmitted by the processing module.

5. The control system for the LIN slave node according to claim 3, wherein the function executing module comprises a detection module, the processor is configured to control the detection module to detect information on the LIN slave node and transmit a feedback signal to the processing module, or the function executing module further comprises a driver module, the processor is configure to control the driver module to control a mechanical component connected to the driver module based on a signal output from the processing module, or the function executing module further comprises a driver module, the processor is configured to control the driver to drive a mechanical component connected to the driver module and a detection module configured to detect information on the LIN slave node and transmit a feedback signal to the processing module.

6. The control system for the LIN slave node according to claim 5, wherein the LIN slave node comprises five operation modes of a sleep mode, a first quasi-sleep mode, a second quasi-sleep mode, a quasi-operation mode and a complete operation mode, based on an operation state of the LIN signal transmitting module, the processing module and the function executing module;

wherein in the sleep mode, the LIN signal detection, reception and control module is in the activated state, and other modules are in the disabled state or in the hibernated state;

in the first quasi-sleep mode, the LIN signal detection, reception and control module is in the activated state, the processing module is in the activated state, and other modules are in the hibernated state or in the disabled state;

in the second quasi-sleep mode, the function executing module is in the hibernated state or in the disabled state;

in the quasi-operation mode, the LIN signal transmitting module is in the disabled state; and in the complete operation mode, all modules are in the activated state.

7. A control method for a Local Interconnect Network, LIN, slave node comprising a processor, comprising:

recognizing, by an LIN signal detection, reception and control module, a wakeup signal on an LIN bus and activating a processing module;

receiving and forwarding, by the LIN signal detection, reception and control module, the signal on the LIN bus;

generating, by the processing module, based on the signal, a control signal for activating an LIN signal transmitting module, or a control signal for disabling the LIN signal transmitting module and/or the processing module; and activating, by the LIN signal detection, reception and control module, the LIN signal transmitting module, or disabling the LIN signal transmitting module and/or the processing module by controlling a state of a power supply module for supplying power to the LIN signal transmitting module and the processing module based on the control signal generated by the processing module.

8. The control method for the LIN slave node according to claim 7, comprising:

receiving and forwarding, by the LIN signal detection, reception and control module, the signal on the LIN bus;

generating, by the processing module, based on the signal, a control signal for activating the LIN signal transmitting module and/or the function executing module, or a control signal for disabling the LIN signal transmitting module and/or the processing module and/or the function executing module; and activating, by the LIN signal detection, reception and control module, the LIN signal transmitting module and/or the function executing module, or disabling the LIN signal transmitting module and/or the processing module and/or the function executing module by controlling a state of the power supply module for supplying power to the LIN signal transmitting module, the processing module and the function executing module based on the control signal generated by the processing module.

9. The control method for the LIN slave node according to claim 8, wherein the process of activating, by the LIN signal detection, reception and control module, the LIN signal transmitting module and/or the function executing module, or disabling the LIN signal transmitting module and/or the processing module and/or the function executing module by controlling a state of the power supply module for supplying power to the LIN signal transmitting module, the processing module and the function executing module based on the control signal generated by the processing module comprises:

activating or disabling directly, by the LIN signal detection, reception and control module, the LIN signal transmitting module based on the control signal generated by the processing module; and hibernating or activating directly, by the processing module, the function executing module.

10. The control method for the LIN slave node according to claim 9, wherein the LIN slave node comprises five operation modes of a sleep mode, a first quasi-sleep mode, a second quasi-sleep mode, a quasi-operation mode and a complete operation mode, based on an operation state of the LIN signal transmitting module, the processing module and the function executing module;

wherein in the sleep mode, the LIN signal detection, reception and control module is in an activated state, and other modules are in a disabled state or in a hibernated state;

in the first quasi-sleep mode, the LIN signal detection, reception and control module is in the activated state, the processing module is in the activated state, and other modules are in the hibernated state or in the disabled state;

in the second quasi-sleep mode, the function executing module is in the hibernated state or in the disabled state;

in the quasi-operation mode, the LIN signal transmitting module is in the disabled state; and in the complete operation mode, all modules are in the activated state.

11. A Local Interconnect Network, LIN, slave node, comprising an electronic control part, wherein the electronic control part comprises an LIN signal detection, reception and control module, a processing module and an LIN signal transmitting module; wherein the electronic control part further comprises a processor and a memory having a processor-executable instruction stored therein, and the instruction when executed by the processor, configure the processor to:

control the LIN signal detection, reception and control module to recognize a signal on an LIN bus and transmit the signal to the processing module;

control the processing module connected to the LIN signal detection, reception and control module, to analyze the signal to obtain an analysis result and transmit a feedback signal corresponding to the analysis result to the LIN bus via the LIN signal transmitting module;

control the LIN signal transmitting module connected to the processing module, to output the feedback signal output from the processing module to the LIN bus;

wherein in a case that a hibernation instruction from the LIN bus is received by the LIN signal detection, reception and control module, or a period within which there is no signal on the LIN bus exceeds a preset length of time, or the processing module determines that a preset condition for switching the LIN slave node to a sleep mode is met, the processing module controls the LIN signal detection, reception and control module to disable the LIN signal transmitting module, and the processing module controls itself to be switched to a hibernated state; or the processing module controls the LIN signal detection, reception and control module to disable the LIN signal transmitting module and the processing module; and when a wakeup signal is received, the LIN signal detection, reception and control module activates the processing module in a disabled state, or the wakeup signal activates the processing module in the hibernated state.

12. The LIN slave node according to claim 11, wherein after the processing module is activated, the processing module controls the LIN signal detection, reception and control module to activate the LIN signal transmitting module, or the processing module controls the LIN signal detection, reception and control module to activate or maintain the LIN signal transmitting module to be in the disabled state based on a received analysis result for an LIN signal.

13. The LIN slave node according to claim 11, wherein the electronic control part further comprises a function executing module connected to the processing module, the processor is configured to control the function executing module to execute an instruction output from the processing module and return a feedback signal, the function executing module is in any one of the disabled state, the hibernated state or an activated state, the function executing module comprises a detection module and/or a driver module, the processor is configured to control the driver module to drive a mechanical part connected to the driver module, and the processor is configured to control the detection module to detect information on the LIN slave node and transmit a feedback signal to the processing module; and the processor is configured to control the processing module to directly activate or hibernate the function executing module, or the processor is configured control the LIN signal detection, reception and control module to activate or disable the function executing module based on a control signal from the processing module.

14. The LIN slave node according to claim 13, wherein The LIN signal detection, reception and control module and the LIN signal transmitting module are integrated into one integrated chip; the processing module and the function executing module are integrated into separate integrated chips, respectively, or both the processing module and the function executing module are integrated into one integrated chip; or the LIN signal detection, reception and control module, the LIN transmitting module, the processing module and the function executing module are integrated into one integrated chip.

15. The LIN slave node according to claim 13, wherein the LIN slave node comprises five operation modes of a sleep mode, a first quasi-sleep mode, a second quasi-sleep mode, a quasi-operation mode and a complete operation mode, based on an operation state of the LIN signal transmitting module, the processing module and the function executing module;

wherein in the sleep mode, the LIN signal detection, reception and control module is in an activated state, and other modules are in a disabled state or in a hibernated state;

in the first quasi-sleep mode, the LIN signal detection, reception and control module is in the activated state, the processing module is in the activated state, and other modules are in the hibernated state or in the disabled state;

in the second quasi-sleep mode, the function executing module is in the hibernated state or in the disabled state;

in the quasi-operation mode, the LIN signal transmitting module is in the disabled state; and in the complete operation mode, all modules are in the activated state.

16. A Local Interconnect Network, LIN, comprising an LIN bus, an LIN master node connected to the LIN bus and an LIN slave node connected to the LIN bus, wherein the LIN slave node comprises an electronic control part, and the electronic control part comprises an LIN signal detection, reception and control module, a processing module and an LIN transmitting module; wherein the electronic control part further comprises a processor and a memory having a processor-executable instruction stored therein, and the instruction when executed by the processor, configured the processor to:

control the LIN signal detection, reception and control module to recognize a signal on the LIN bus and transmit the signal to the processing module;

control the processing module connected to the LIN signal detection, reception and control module, to analyze the signal to obtain an analysis result and transmit a feedback signal corresponding to the analysis result to the LIN bus via the LIN signal transmitting module;

control the LIN signal transmitting module connected to the processing module, to output the feedback signal output from the processing module to the LIN bus;

wherein in a case that a hibernation instruction from the LIN bus is received by the LIN signal detection, reception and control module, or a period within which there is no signal on the LIN bus exceeds a preset length of time, or the processing module determines that a preset condition for switching the LIN slave node to a sleep mode is met, the processing module controls the LIN signal detection, reception and control module to disable the LIN signal transmitting module, and the processing module controls itself to be switched to a hibernated state; or the processing module controls the LIN signal detection, reception and control module to disable the LIN signal transmitting module and the processing module;

when a wakeup signal is received, the LIN signal detection, reception and control module activates the processing module in a disabled state, or the wakeup signal activates the processing module in a hibernated state; and after the processing module is activated, the processing module controls the LIN signal detection, reception and control module to activate the LIN transmitting module, or the processing module controls the LIN signal detection, reception and control module to activate the LIN signal transmitting module or maintain the LIN signal transmitting module to be in the disabled state based on an analysis result for an LIN signal.

17. The LIN according to claim 16, wherein the electronic control part further comprises a function executing module, and the function executing module is in any one of the disabled state, the hibernated state or an activated state;

wherein the LIN slave node comprises five operation modes of a sleep mode, a first quasi-sleep mode, a second quasi-sleep mode, a quasi-operation mode and a complete operation mode, based on an operation state of the LIN signal transmitting module, the processing module and the function executing module;

wherein in the sleep mode, the LIN signal detection, reception and control module is in an activated state, and other modules are in a disabled state or in a hibernated state;

in the first quasi-sleep mode, the LIN signal detection, reception and control module is in the activated state, the processing module is in the activated state, and other modules are in the hibernated state or in the disabled state;

in the second quasi-sleep mode, the function executing module is in the hibernated state or in the disabled state;

in the quasi-operation mode, the LIN signal transmitting module is in the disabled state; and in the complete operation mode, all modules are in the activated state.

18. The control system for the LIN slave node according to claim 2, wherein the electronic control part further comprises a function executing module, the processor is configure the function executing module to execute an instruction output from the processing module and return a feedback signal, the function executing module has an activated state, the hibernated state and the disabled state, the function executing module is connected to the processing module;

wherein processor is configured the processing module is to directly activate or hibernate the function executing module, or the LIN signal detection, reception and control module is configured to activate or disable the function executing module based on the control signal from the processing module.

19. The control system for the LIN slave node according to claim 4, wherein the function executing module comprises a detection module, the processor is configured to detect information on the LIN slave node and transmit a feedback signal to the processing module, or the function executing module further comprises a driver module, the processor is configured to control the driver module to control a mechanical component connected to the driver module based on a signal output from the processing module, or the function executing module further comprises a driver module, the processor is configured to control the driver module to drive a mechanical component connected to the driver module and a detection module configured to detect information on the LIN slave node and transmit a feedback signal to the processing module.

20. The LIN slave node according to claim 12, wherein the electronic control part further comprises a function executing module connected to the processing module, the processor is configured to control the function executing module to execute an instruction output from the processing module and return a feedback signal, the function executing module is in any one of the disabled state, the hibernated state or an activated state, the function executing module comprises a detection module and/or a driver module, the processor is configured to control the driver module to drive a mechanical part connected to the driver module, and the processor is configured to control the detection module to detect information on the LIN slave node and transmit a feedback signal to the processing module; and the processor is configured to control the processing module to directly activate or hibernate the function executing module, or the processor is configured to control the LIN signal detection, reception and control module to activate or disable the function executing module based on a control signal from the processing module.

* * * * *